(12) United States Patent
Pande et al.

(10) Patent No.: US 12,276,993 B2
(45) Date of Patent: Apr. 15, 2025

(54) CHARGE PUMP BASED LOW DROPOUT REGULATOR

(71) Applicant: QUALCOMM Incorporated, San Diego, CA (US)

(72) Inventors: Darshan Chandrashekhar Pande, Aurangabad (IN); Chulkyu Lee, San Diego, CA (US); Sajin V Mohamad, San Diego, CA (US); Suresh Naidu Lekkala, Bangalore (IN)

(73) Assignee: QUALCOMM INCORPORATED, San Diego, CA (US)

( * ) Notice: Subject to any disclaimer, the term of this patent is extended or adjusted under 35 U.S.C. 154(b) by 218 days.

(21) Appl. No.: 17/928,174

(22) PCT Filed: Apr. 15, 2021

(86) PCT No.: PCT/US2021/027440
§ 371 (c)(1),
(2) Date: Nov. 28, 2022

(87) PCT Pub. No.: WO2022/019969
PCT Pub. Date: Jan. 27, 2022

(65) Prior Publication Data
US 2023/0221744 A1    Jul. 13, 2023

(30) Foreign Application Priority Data
Jul. 24, 2020  (IN) .............................. 202041031744

(51) Int. Cl.
*G05F 1/575*    (2006.01)
*H02M 3/07*    (2006.01)

(52) U.S. Cl.
CPC .............. *G05F 1/575* (2013.01); *H02M 3/07* (2013.01)

(58) Field of Classification Search
CPC . G05F 1/575; G05F 1/56; G05F 1/565; G05F 1/59; H02M 3/07
See application file for complete search history.

(56) References Cited

U.S. PATENT DOCUMENTS

| 5,631,598 A | 5/1997 | Miranda et al. |
| 6,046,577 A | 4/2000 | Rincon-Mora et al. |

(Continued)

FOREIGN PATENT DOCUMENTS

| CN | 1175018 A | 3/1998 |
| CN | 100367142 C | 2/2008 |

(Continued)

OTHER PUBLICATIONS

Akhamal H., et al., "Fast Transient Response Low Drop-out Voltage Regulator," International Journal of Embedded Systems and Applications (IJESA), Sep. 2014, vol. 4, No. 2/3, pp. 1-10.

(Continued)

*Primary Examiner* — Gary L Laxton
(74) *Attorney, Agent, or Firm* — Loza & Loza, LLP

(57) ABSTRACT

In certain aspects, a voltage regulator includes a pass transistor coupled between an input of the voltage regulator and an output of the voltage regulator, and an amplifier having a first input coupled to a reference voltage, a second input coupled to the output of the voltage regulator via a feedback path, and an output. The voltage regulator also includes a voltage booster coupled between the output of the amplifier and a gate of the pass transistor. In certain aspects, the voltage booster includes a first capacitor and a second capacitor for double charge pumping. In certain aspects, a control circuit of the voltage booster is coupled to a voltage source that is independent of an output voltage of the amplifier.

25 Claims, 15 Drawing Sheets

(56) References Cited

U.S. PATENT DOCUMENTS

| | | | |
|---|---|---|---|
| 6,147,550 A | 11/2000 | Holloway | |
| 6,188,211 B1 | 2/2001 | Rincon-Mora et al. | |
| 6,188,212 B1 | 2/2001 | Larson et al. | |
| 6,359,427 B1 | 3/2002 | Edwards et al. | |
| 6,522,111 B2 | 2/2003 | Zadeh et al. | |
| 6,586,917 B1 | 7/2003 | Smith | |
| 6,617,832 B1 | 9/2003 | Kobayashi | |
| 6,791,390 B2 | 9/2004 | Gay | |
| 6,856,124 B2 | 2/2005 | Dearn et al. | |
| 7,106,032 B2 | 9/2006 | Chen et al. | |
| 7,109,690 B2 | 9/2006 | Ke et al. | |
| 7,148,670 B2 | 12/2006 | Inn et al. | |
| 7,215,103 B1 | 5/2007 | Wong et al. | |
| 7,312,598 B1 | 12/2007 | Huang | |
| 7,492,137 B2 | 2/2009 | Yamada | |
| 7,495,420 B2 | 2/2009 | Vinn | |
| 7,504,814 B2 | 3/2009 | Lee et al. | |
| 7,548,051 B1 | 6/2009 | Tenbroek et al. | |
| 7,622,902 B1 | 11/2009 | Kao et al. | |
| 7,710,090 B1 | 5/2010 | Kimura | |
| 7,893,670 B2 | 2/2011 | Pulijala et al. | |
| 8,072,196 B1 | 12/2011 | Li | |
| 8,080,983 B2 | 12/2011 | Lourens et al. | |
| 8,115,463 B2 | 2/2012 | Wang | |
| 8,154,263 B1 | 4/2012 | Shi et al. | |
| 8,248,150 B2 | 8/2012 | Tadeparthy et al. | |
| 8,294,441 B2 | 10/2012 | Gurcan et al. | |
| 8,624,568 B2 | 1/2014 | Ivanov et al. | |
| 8,841,893 B2 | 9/2014 | Bulzacchelli et al. | |
| 9,170,590 B2 | 10/2015 | Price et al. | |
| 9,223,329 B2 | 12/2015 | Pulvirenti et al. | |
| 9,274,534 B2 | 3/2016 | Fang et al. | |
| 9,292,026 B2 | 3/2016 | Bhattad | |
| 9,377,798 B2 | 6/2016 | Bhattad | |
| 9,535,439 B2 | 1/2017 | Jain et al. | |
| 9,543,826 B2 | 1/2017 | Chen et al. | |
| 9,577,508 B2 | 2/2017 | Wang | |
| 9,588,541 B1 | 3/2017 | Ho et al. | |
| 9,608,522 B2 | 3/2017 | Lin et al. | |
| 9,684,325 B1 | 6/2017 | Rasmus | |
| 9,740,225 B1 | 8/2017 | Wong | |
| 9,746,864 B1 | 8/2017 | Narang et al. | |
| 9,778,672 B1 | 10/2017 | Gao et al. | |
| 9,946,283 B1 | 4/2018 | Yung et al. | |
| 9,983,604 B2 | 5/2018 | Lee et al. | |
| 10,013,005 B1 | 7/2018 | Ippili | |
| 10,133,289 B1 | 11/2018 | Ankamreddi et al. | |
| 10,234,883 B1 | 3/2019 | Du et al. | |
| 10,310,530 B1 | 6/2019 | Lu et al. | |
| 10,411,599 B1 | 9/2019 | Shi et al. | |
| 10,423,178 B1 * | 9/2019 | Chen | G05F 1/56 |
| 10,444,780 B1 | 10/2019 | Cheng et al. | |
| 10,459,468 B1 | 10/2019 | Ankamreddi et al. | |
| 10,545,523 B1 | 1/2020 | Wu et al. | |
| 10,591,938 B1 | 3/2020 | Golara | |
| 11,003,202 B2 | 5/2021 | Golara | |
| 11,372,436 B2 | 6/2022 | Ahmed | |
| 11,480,986 B2 | 10/2022 | Golara | |
| 2003/0178976 A1 | 9/2003 | Xi | |
| 2004/0000896 A1 | 1/2004 | Barber, Jr. et al. | |
| 2004/0027097 A1 | 2/2004 | Denicholas et al. | |
| 2004/0140845 A1 | 7/2004 | Eberlein | |
| 2005/0189930 A1 | 9/2005 | Wu et al. | |
| 2005/0206444 A1 | 9/2005 | Perez et al. | |
| 2005/0248331 A1 | 11/2005 | Whittaker et al. | |
| 2006/0164053 A1 | 7/2006 | Walter et al. | |
| 2006/0181258 A1 | 8/2006 | Benbrik | |
| 2007/0057655 A1 | 3/2007 | Nishida | |
| 2007/0139030 A1 | 6/2007 | Lee et al. | |
| 2007/0242536 A1 | 10/2007 | Matsubara | |
| 2008/0211467 A1 | 9/2008 | Huang et al. | |
| 2008/0278127 A1 | 11/2008 | Nagata | |
| 2008/0303496 A1 | 12/2008 | Schlueter et al. | |
| 2009/0010035 A1 | 1/2009 | Williams | |
| 2009/0179622 A1 | 7/2009 | Ivanov et al. | |
| 2009/0189577 A1 | 7/2009 | Lin et al. | |
| 2009/0189591 A1 | 7/2009 | Sperling et al. | |
| 2009/0219077 A1 | 9/2009 | Pietri et al. | |
| 2009/0243568 A1 | 10/2009 | Nguyen | |
| 2009/0256627 A1 * | 10/2009 | Hernandez-Garduno | H02M 3/073 327/536 |
| 2009/0322429 A1 | 12/2009 | Ivanov et al. | |
| 2010/0327959 A1 | 12/2010 | Lee | |
| 2011/0089916 A1 | 4/2011 | Soenen et al. | |
| 2011/0156674 A1 | 6/2011 | Lin et al. | |
| 2012/0112718 A1 | 5/2012 | Pons | |
| 2012/0187897 A1 | 7/2012 | Lenk et al. | |
| 2012/0229111 A1 | 9/2012 | Serdarevic | |
| 2012/0299564 A1 | 11/2012 | Howes et al. | |
| 2013/0099764 A1 | 4/2013 | Zhang et al. | |
| 2013/0113447 A1 | 5/2013 | Kadanka | |
| 2013/0147447 A1 | 6/2013 | Liu et al. | |
| 2013/0181521 A1 | 7/2013 | Khlat | |
| 2013/0221940 A1 | 8/2013 | Yan et al. | |
| 2014/0042998 A1 | 2/2014 | Saito et al. | |
| 2014/0084896 A1 | 3/2014 | Zhang et al. | |
| 2014/0139197 A1 | 5/2014 | Price et al. | |
| 2014/0139198 A1 | 5/2014 | Manlove et al. | |
| 2014/0253072 A1 | 9/2014 | Hussien et al. | |
| 2014/0266103 A1 | 9/2014 | Wang et al. | |
| 2014/0277812 A1 | 9/2014 | Shih et al. | |
| 2014/0306676 A1 | 10/2014 | Hu et al. | |
| 2015/0028828 A1 | 1/2015 | Chen | |
| 2015/0103566 A1 | 4/2015 | Keogh et al. | |
| 2015/0115809 A1 | 4/2015 | Siessegger | |
| 2015/0115830 A1 | 4/2015 | Siessegger | |
| 2015/0137780 A1 | 5/2015 | Lerner et al. | |
| 2015/0160668 A1 | 6/2015 | Pujol et al. | |
| 2015/0168969 A1 | 6/2015 | Shor | |
| 2015/0188421 A1 | 7/2015 | Ko | |
| 2015/0192943 A1 | 7/2015 | Roham et al. | |
| 2015/0198959 A1 | 7/2015 | Kuttner | |
| 2015/0198960 A1 | 7/2015 | Zhang et al. | |
| 2015/0220096 A1 | 8/2015 | Luff | |
| 2015/0286232 A1 | 10/2015 | Parikh | |
| 2015/0349622 A1 | 12/2015 | Lo et al. | |
| 2015/0362936 A1 | 12/2015 | Patel et al. | |
| 2016/0124448 A1 | 5/2016 | Murukumpet et al. | |
| 2016/0349776 A1 | 12/2016 | Conte et al. | |
| 2017/0017250 A1 | 1/2017 | Peluso et al. | |
| 2017/0045901 A1 | 2/2017 | Price et al. | |
| 2017/0052552 A1 | 2/2017 | Mahmoudi et al. | |
| 2017/0083034 A1 | 3/2017 | Yang et al. | |
| 2017/0115680 A1 | 4/2017 | Zhou et al. | |
| 2017/0117803 A1 | 4/2017 | Matsuki et al. | |
| 2017/0185096 A1 | 6/2017 | Rueger et al. | |
| 2017/0205841 A1 | 7/2017 | Jefremow et al. | |
| 2017/0212540 A1 | 7/2017 | Cho et al. | |
| 2017/0220059 A1 | 8/2017 | Kadowaki | |
| 2017/0269620 A1 | 9/2017 | Duong et al. | |
| 2017/0322575 A1 | 11/2017 | Du et al. | |
| 2017/0364110 A1 | 12/2017 | Golara et al. | |
| 2017/0371365 A1 | 12/2017 | Kossel | |
| 2018/0217623 A1 | 8/2018 | Bhattad et al. | |
| 2019/0146532 A1 | 5/2019 | Ballarin et al. | |
| 2020/0244160 A1 | 7/2020 | Mitev | |

FOREIGN PATENT DOCUMENTS

| | | |
|---|---|---|
| CN | 101419477 A | 4/2009 |
| CN | 102043417 A | 5/2011 |
| CN | 202494944 U | 10/2012 |
| CN | 103034275 A | 4/2013 |
| CN | 203745939 U | 7/2014 |
| CN | 104345763 A | 2/2015 |
| CN | 105917285 A | 8/2016 |
| CN | 106959721 A | 7/2017 |
| CN | 108445950 A | 8/2018 |
| CN | 112930506 B | 9/2022 |
| DE | 102012100146 A1 | 7/2012 |
| EP | 1111493 A1 | 6/2001 |
| EP | 1253498 A1 | 10/2002 |
| EP | 2195720 A1 | 6/2010 |

(56) References Cited

FOREIGN PATENT DOCUMENTS

| | | |
|---|---|---|
| EP | 1508078 B1 | 12/2010 |
| EP | 2849020 A1 | 3/2015 |
| TW | 200933333 A | 8/2009 |
| TW | 201013355 A | 4/2010 |
| TW | I357204 B | 1/2012 |
| TW | I397793 B | 6/2013 |
| WO | 2012004083 A1 | 1/2012 |
| WO | 2012047738 A1 | 4/2012 |
| WO | 2014042726 A1 | 3/2014 |
| WO | 2014078803 A1 | 5/2014 |
| WO | 2014177901 A1 | 11/2014 |
| WO | 2015047276 A1 | 4/2015 |
| WO | 2016026416 A1 | 2/2016 |
| WO | 2016082420 A1 | 6/2016 |
| WO | 2016202398 A1 | 12/2016 |
| WO | 2017075156 A1 | 5/2017 |

OTHER PUBLICATIONS

Alon E., et al., "Replica Compensated Linear Regulators for Supply-Regulated Phase-Locked Loops," IEEE Journal of Solid-State Circuits, vol. 41, No. 2, Feb. 2006, pp. 413-424.

Assi A., et al., "A Fully Differential and Tunable CMOS Current Mode opamp Based on Transimpedance-Transconductance Technique", Circuits and Systems, 1997. Proceedings of the 40th Midwest Symposium on Sacramento, CA, USA Aug. 3-6, 1997, New York, NY, USA, IEEE, US, vol. 1, Aug. 3, 1997 (Aug. 3, 1997), pp. 168-171, XP010272437, DOI: 10.1109/MWSCAS. 1997.666060, ISBN: 978-0-7803-3694-0.

Bontempo G., et al., "Low Supply Voltage, Low Quiescent Current, ULDO Linear Regulator," The 8th IEEE International Conference on Electronics, Circuits and Systems 2001, pp. 409-412.

Bulzacchelli J.F., et al., "Dual-Loop System of Distributed Microregulators With High DC Accuracy, Load Response Time Below 500 ps, and 85-mV Dropout Voltage," IEEE Journal of Solid-State Circuits, vol. 47, No. 4, Apr. 2012, pp. 863-874.

Camacho D., et al., "An NMOS Low Dropout Voltage Regulator with Switched Floating Capacitor Gate Overdrive," Department of Electrical Engineering, Southern Methodist University, Dallas, Texas, USA, 52nd IEEE International Midwest Symposium on Circuits and Systems, Aug. 2009, pp. 808-811.

Chengpeng L., et al., "Fvf Ldo Regulator with Dual Dynamic-Load Composite Gain Stage", Analog Integrated Circuits and Signal Processing, Springer New York LLC, US, vol. 92, No. 1, Apr. 17, 2017 (Apr. 17, 2017), pp. 131-140, XP036245594, ISSN: 0925-1030, DOI: 10.1007 /S10470-017 -0972-9, [retrieved on Apr. 17, 2017], abstract; figure 3.

Den Besten G.W., et al., "Embedded 5 V-to-3.3 V Voltage Regulator for Supplying Digital IC's in 3.3 V CMOS Technology," IEEE Journal of Solid-State Circuits, vol. 33, No. 7, Jul. 1998, pp. 956-962.

Favrat P., et al., "A New High Efficiency CMOS Voltage Doubler", Proceedings of the IEEE 1997 Custom Integrated Circuits Symposium, Santa Clara, May 5-8, 1997, [Proceedings of the IEEE Custom Integrated Circuits Symposium], New York, IEEE, US, vol. Conf. 19, May 5, 1997 (May 5, 1997), XP000751486, pp. 259-262, ISBN: 978-0-7803-3670-4 abstract, figure 7.

Guo J., et al., "A 6-uW Chip-Area-Efficient Output-Capacitorless LDO in 90-nm CMOS Technology", IEEE Journal of Solid-State Circuits, IEEE Service Center, Piscataway, NJ, USA, vol. 45, No. 9, Sep. 1, 2010 (Sep. 1, 2010), pp. 1896-1905, XP011317129, ISSN: 0018-9200, DOI: 10.1109/JSSC.2010.2053859, abstract, figure 6.

Gupta V., et al., "A Low Dropout, CMOS Regulator with High PSR over Wideband Frequencies", IEEE International Symposium on Circuits and Systems, May 2005, pp. 4245-4248.

Hazucha P., et al., "Area-Efficient Linear Regulator With Ultra-Fast Load Regulation", IEEE Journal of Solid-State Circuits, vol. 40, No. 4, Apr. 2005, pp. 933-940.

Hinojo J.M., et al., "FVF-Based Low-Dropout Voltage Regulator with Fast Charging/Discharging Paths for Fast Line and Load Regulation", ETRI Journal, vol. 39, No. 3, Jun. 1, 2017 (Jun. 1, 2017), pp. 373-382, XP055646709, KR ISSN: 1225-6463, DOI: 10.4218/etrij.17.0116.0766, abstract; figure 3.

Huang H-Y., et al., "A Wideband CMOS Transconductance-Transimpedance Amplifier", Midwest Symposium on Circuits And Systems. Cairo, Egypt, Dec. 27-30, 2003; [Midwest Symposium on Circuits and Systems], Piscataway, NJ, IEEE, US, vol. 1, Dec. 27, 2003 (Dec. 27, 2003), pp. 153-156, XP010867413, DOI: 10.1109/MWSCAS.2003.1562241, ISBN: 978-0-7803-8294-7.

International Search Report and Written Opinion—PCT/US2021/027440—ISAEPO—Jul. 29, 2021.

Lu Y., et al., "A 0.65ns-Response-Time 3.01ps FOM Fully-Integrated Low-Dropout Regulator with Full-Spectrum Power-Supply-Rejection for Wideband Communication Systems," IEEE International Solid-State Circuits Conference, Technical Papers, Feb. 2014, pp. 306-307. Retrieved from the Internet: URL:http://www.researchgate.net/publication/271550565.

Maksimovic D., et al., "Switched—Capacitor DC-DC Converters for Low-Power on-Chip Applications", Power Electronics Specialists Conference, 1999, PESC 99, 30TH Annual IEEE Charleston, SC, USA Jun. 27-Jul. 1, 1999, Piscataway, NJ, USA, IEEE, US, vol. 1, Jun. 27, 1999 (Jun. 27, 1999), XP010346884, pp. 54-59, DOI: 10.1109/PESC. 1999.788980 ISBN: 978-0-7803-5421-0 abstract, figure 8.

Milliken R.J., et al., "Full On-Chip CMOS Low-Dropout Voltage Regulator", IEEE Transactions on Circuits and Systems I: Regular Papers, vol. 54, No. 9, Sep. 2007, pp. 1879-1890.

Paxton A., "Extend Battery Life with a LDO, a Voltage Supervisor and a FET", Jul. 31, 2017 (Jul. 31, 2017), XP055671473, 5 pages, Retrieved from the Internet: URL: https://web.archive.org/web/20170731140511/http://e2e.ti.com:80/blogs_/archives/b/fullycharged/archive/2017/02/21/extend-battery-life-with-a-ldo-a-voltage-supervisor-and-a-fet [retrieved on Feb. 25, 2020] p. 2-p. 5.

Rincon-Mora G.A., et al., "A Low-Voltage, Low Quiescent Current, Low Drop-Out Regulator," IEEE Journal of Solid-State Circuits, Jan. 1998, vol. 33, No. 1, pp. 36-44.

Teel J.C., "Understanding Power Supply Ripple Rejection in Linear Regulators", Analog Applications Journal, Analog and Mixed-Signal Products, 2005, 4 Pages.

\* cited by examiner

CHARGE PUMP BASED LOW DROPOUT REGULATOR

CROSS-REFERENCE TO RELATED APPLICATION(S)

This application is the U.S. national stage of PCT patent application number PCT/US2021/027440 filed on Apr. 15, 2021, which claims priority to and the benefit of Indian patent application number 202041031744 filed in the Indian Patent Office on Jul. 24, 2020, the entire contents of which are incorporated herein by reference as if fully set forth below in their entirety and for all applicable purposes.

BACKGROUND

Field

Aspects of the present disclosure relate generally to voltage regulators, and more particularly, to low dropout (LDO) regulators.

Background

Voltage regulators are used in a variety of systems to provide regulated voltages to power circuits in the systems. A commonly used voltage regulator is a low dropout (LDO) regulator. An LDO regulator may be used to provide a clean regulated voltage to power a circuit from a noisy input supply voltage. An LDO regulator typically includes a pass element and an error amplifier coupled in a feedback loop to maintain an approximately constant output voltage based on a stable reference voltage.

SUMMARY

The following presents a simplified summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

A first aspect relates to a voltage regulator. The voltage regulator includes a pass transistor coupled between an input of the voltage regulator and an output of the voltage regulator, and an amplifier having a first input coupled to a reference voltage, a second input coupled to the output of the voltage regulator via a feedback path, and an output. The voltage regulator also includes a voltage booster having an input coupled to the output of the amplifier and an output coupled to a gate of the pass transistor. The voltage booster includes a first capacitor, a second capacitor, a first switch coupled between the input of the voltage booster and a first terminal of the first capacitor, a second switch coupled between the input of the voltage booster and a first terminal of the second capacitor, a third switch coupled between the first terminal of the first capacitor and the output of the voltage booster, and a fourth switch coupled between the first terminal of the second capacitor and the output of the voltage booster.

A second aspect relates to a chip. The chip includes a supply rail, a circuit, and a voltage regulator having an input coupled to the supply rail and an output coupled to the circuit. The voltage regulator includes a pass transistor coupled between the input of the voltage regulator and the output of the voltage regulator, and an amplifier having a first input coupled to a reference voltage, a second input coupled to the output of the voltage regulator via a feedback path, and an output. The voltage regulator also includes a voltage booster having an input coupled to the output of the amplifier and an output coupled to a gate of the pass transistor. The voltage booster includes a first capacitor, a second capacitor, a first switch coupled between the input of the voltage booster and a terminal of the first capacitor, a second switch coupled between the input of the voltage booster and a terminal of the second capacitor, a third switch coupled between the terminal of the first capacitor and the output of the voltage booster, and a fourth switch coupled between the terminal of the second capacitor and the output of the voltage booster.

A third aspect relates to a method of operating a voltage regulator. The voltage regulator includes a pass transistor coupled between an input of the voltage regulator and an output of the voltage regulator, and an amplifier having a first input coupled to a reference voltage, a second input coupled to the output of the voltage regulator via a feedback path, and an output. The method includes, during a first time period, transferring charge between the output of the amplifier and a first terminal of a first capacitor, boosting a voltage of a second capacitor, and transferring charge between a first terminal of the second capacitor and an output capacitor, wherein the output capacitor is coupled to a gate of the pass transistor. The method also includes, during a second time period, transferring charge between the output of the amplifier and the first terminal of the second capacitor, boosting a voltage of the first capacitor, and transferring charge between the first terminal of the first capacitor and the output capacitor.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
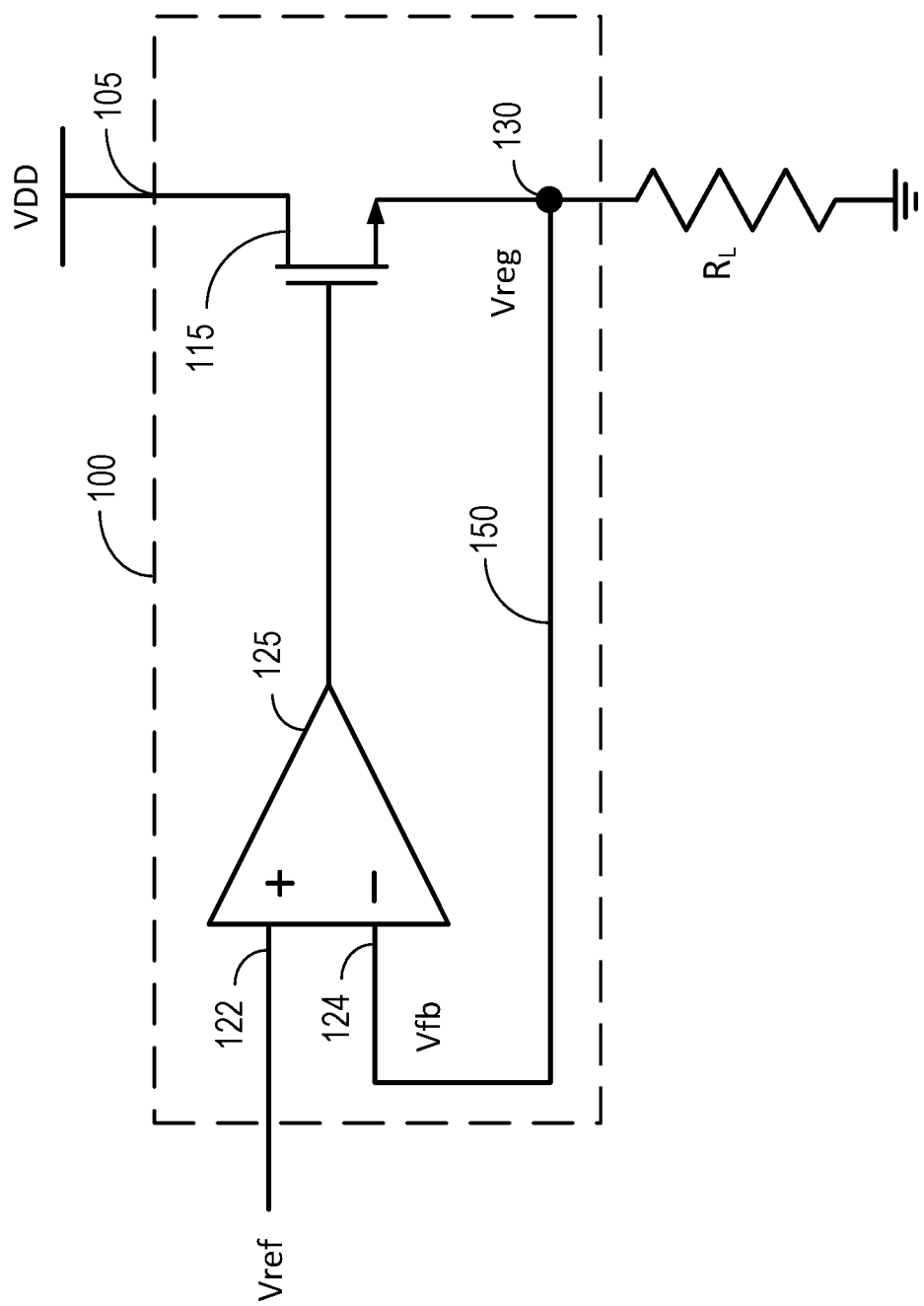
FIG. 1 shows an example of a low dropout (LDO) regulator.

FIG. 1 shows an example of a low dropout (LDO) regulator 100 according to certain aspects of the present disclosure. The LDO regulator 100 may be used to provide a noise-sensitive circuit (not shown) with a clean regulated voltage to power the circuit from a noisy input supply voltage. The noisy input supply voltage may come from a switching regulator used to convert a voltage of a battery to the input supply voltage or may come from another voltage source.

The LDO regulator 100 includes a pass n-type field effect transistor (NFET) 115 and an error amplifier 125. The pass NFET 115 has a drain coupled to the input 105 of the LDO regulator 100, a gate coupled to the output of the error amplifier 125, and a source coupled to the output 130 of the LDO regulator 100. The input 105 of the LDO regulator 100 is coupled to a voltage supply rail to receive supply voltage VDD. In FIG. 1, the resistor $R_L$ represents the load of a circuit (not shown) coupled to the output 130 of the LDO regulator 100.

The error amplifier 125 controls the resistance of the pass NFET 115 between the input 105 and the output 130 of the LDO regulator 100 by adjusting the gate voltage of the pass NFET 115. More particularly, the error amplifier 125 increases the resistance of the pass NFET 115 by decreasing the gate voltage and decreases the resistance of the pass NFET 115 by increasing the gate voltage.

In this example, a reference voltage (denoted "Vref") is input to a first input 122 (e.g., plus input) of the error amplifier 125. A second input 124 (e.g., minus input) of the error amplifier 125 is coupled to the output 130 via a feedback path 150. In this example, the regulated voltage Vreg at the output 130 is fed back to the second input 124 of the error amplifier 125 as a feedback voltage (denoted "Vfb") via the feedback path 150. During operation, the error amplifier 125 drives the gate of the pass NFET 115 in a direction that reduces the difference (i.e., error) between the reference voltage Vref and the feedback voltage Vfb. Since the feedback voltage Vfb is approximately equal to the regulated voltage Vreg in this example, the error amplifier 125 drives the gate of the pass NFET 115 in a direction that causes the regulated voltage Vreg to be approximately equal to the reference voltage Vref.

Figure 2:
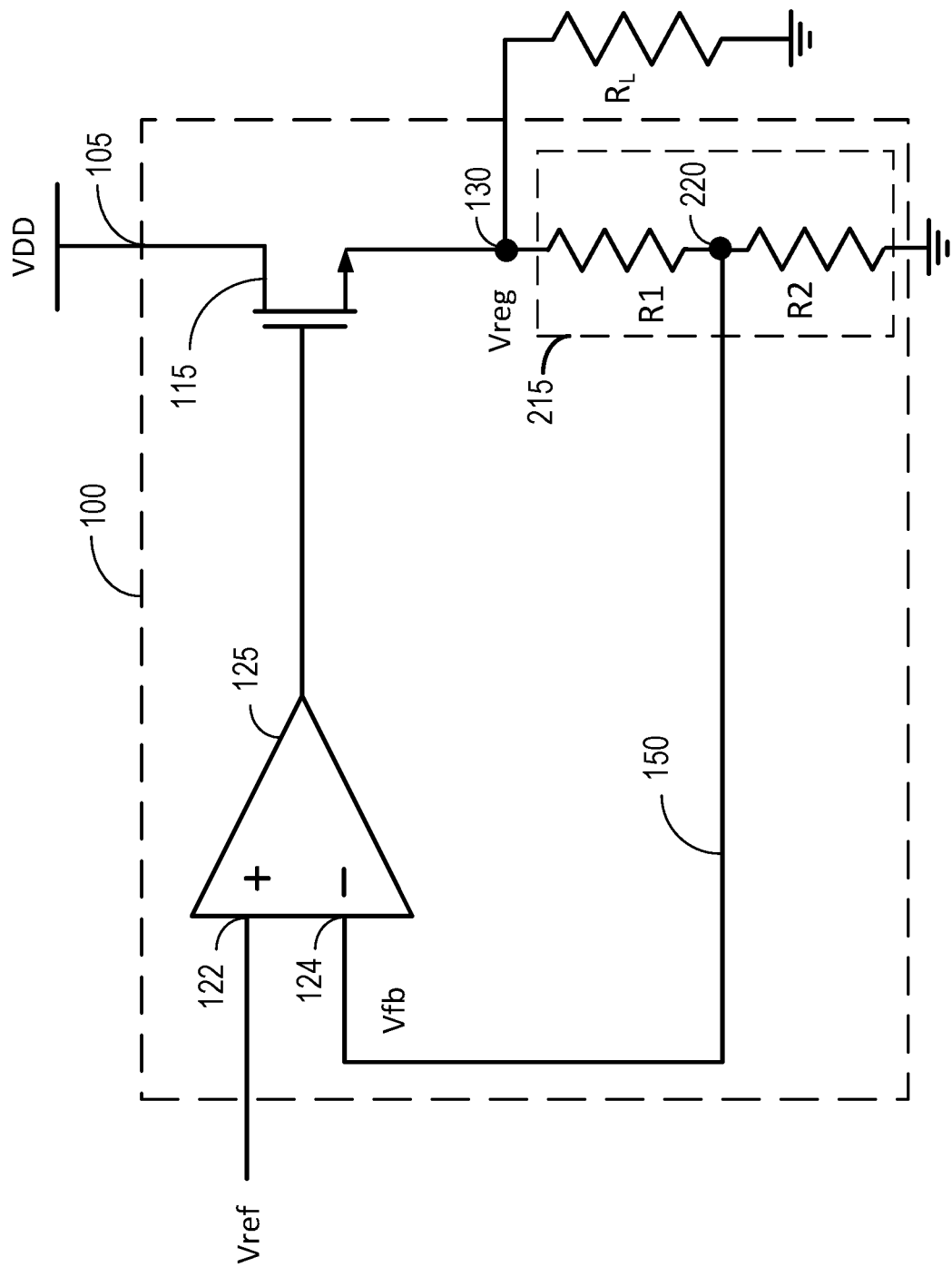
FIG. 2 shows an example of an LDO regulator including a voltage divider in a feedback path.

In the example in FIG. 1, the regulated voltage Vreg is fed directly to the error amplifier 125. However, it is to be appreciated that the present disclosure is not limited to this example. For example, FIG. 2 shows another example of the LDO regulator 100, in which the regulated voltage Vref is fed back to the error amplifier 125 through a voltage divider 215. The voltage divider 215 includes two series resistors R1 and R2 coupled to the output 130 of the LDO regulator 100. The voltage at the node 220 between the resistors R1 and R2 is fed back to the amplifier 125. In this example, the feedback voltage Vfb is related to the regulated voltage Vreg as follows:

$$Vfb = \left(\frac{R2}{R1 + R2}\right) \cdot Vreg \quad (1)$$

where R1 and R2 in equation (1) are the resistances of resistors R1 and R2, respectively. Thus, in this example, the feedback voltage Vfb is proportional to the regulated voltage Vreg, in which the proportionality is set by the ratio of the resistances of resistors R1 and R2.

The error amplifier 125 drives the gate of the pass NFET 115 in a direction that reduces the difference (i.e., error) between the feedback voltage Vfb and reference voltage Vref. This feedback causes the regulated voltage Vreg to be approximately equal to:

$$Vreg = \left(1 + \frac{R1}{R2}\right) \cdot Vref \quad (2)$$

As shown in equation (2), in this example, the regulated voltage may be set to a desired voltage by setting the ratio of the resistances of resistors R1 and R2 accordingly. Therefore, in the present disclosure, it is to be appreciated that the feedback voltage Vfb may be equal to or proportional to the regulated voltage Vreg.

In the examples in FIGS. 1 and 2, the pass element of the LDO regulator 100 is implemented with the pass NFET 115. The pass NFET 115 may be fabricated using a planar process, a FinFET process, and/or another fabrication process. Implementing the pass element with the pass NFET 115 has several advantages over implementing the pass element with a p-type field effect transistor (PFET). One advantage is that the relatively low impedance of the pass NFET 115 at the output 130 of the LDO regulator 100 helps prevent a low-frequency pole from forming at the output 130. This may eliminate the need for a large compensation capacitor at the output 130. In addition, this may make the stability of the loop substantially independent of the load. Further, an NFET based LDO regulator may have better power supply rejection ratio (PSRR), low output ripple, and high stability.

However, a problem with using the pass NFET 115 for the pass element of the LDO regulator 100 is that the gate voltage of the pass NFET 115 needs to be above the regulated voltage Vreg by at least the threshold voltage of the pass NFET 115 in order for the pass NFET 115 to turn on. In cases where the error amplifier 125 is powered by VDD, the maximum voltage that the error amplifier 125 is able to output to the gate of the pass NFET 115 may be approximately VDD. In these cases, the maximum regulated voltage Vreg at the output 130 of the LDO regulator 100 is limited to approximately VDD minus the threshold voltage of the pass NFET 115, which reduces the regulated voltage range of the LDO regulator 100.

Figure 3:
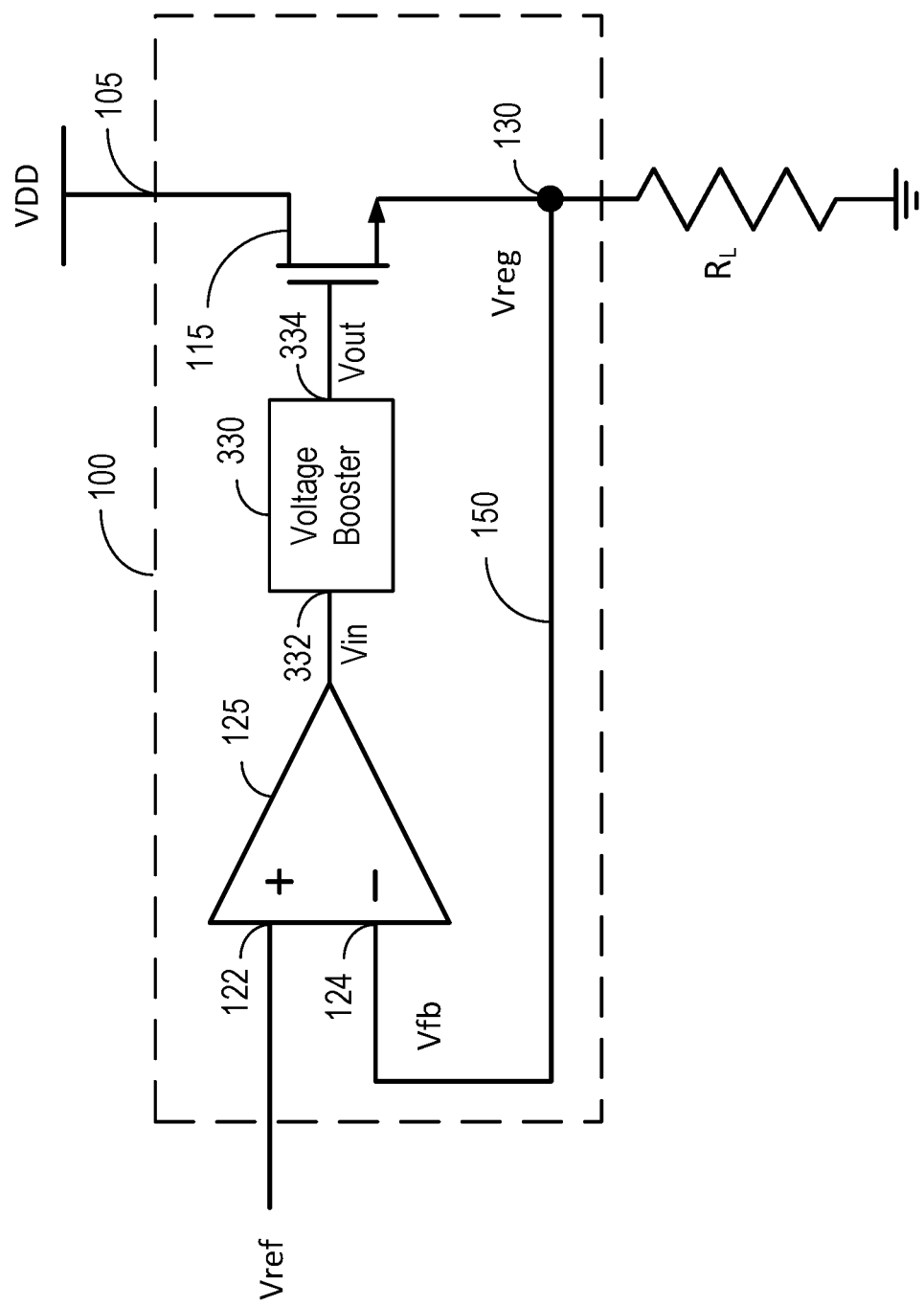
FIG. 3 shows an example of an LDO regulator including a voltage booster according to certain aspects of the present disclosure.

One approach to address the above problem is to boost the voltage at the output of the error amplifier 125 and apply the boosted voltage to the gate of the pass NFET 115. In this regard, FIG. 3 shows an exemplary LDO regulator 100 including a voltage booster 330 coupled between the output of the error amplifier 125 and the gate of the pass NFET 115. The voltage booster 330 has an input 332 coupled to the output of the error amplifier 125, and an output 334 coupled to the gate of the pass NFET 115. The voltage booster 330 is configured to receive the output voltage of the amplifier 125 at the input 332 of the voltage booster 330 (denoted "Vin"), boost (i.e., increase) the output voltage of the amplifier 125 to generate a boosted voltage, and output the boosted voltage at the output 334 of the voltage booster 330 (denoted "Vout"). For example, the voltage booster 330 may double the voltage at the output of the error amplifier 125. In this example, the voltage booster 330 may be referred to as a voltage doubler. The boosted voltage at the gate of the pass NFET 115 may exceed the supply voltage VDD, allowing the LDO regulator 100 to set the regulated voltage Vreg closer to VDD and reduce the dropout voltage across the pass NFET 115.

In the example in FIG. 3, the regulated voltage Vreg is fed directly to the error amplifier 125 via feedback path 150. However, it is to be appreciated that the present disclosure is not limited to this example. For instance, a voltage divider (e.g., voltage divider 215) may be placed in the feedback path 150 from the output 130 of the LDO regulator 100 to the second input 124 of the error amplifier 125, in which case the feedback voltage Vfb is proportional to the regulated voltage Vreg, as discussed above.

Figure 4:
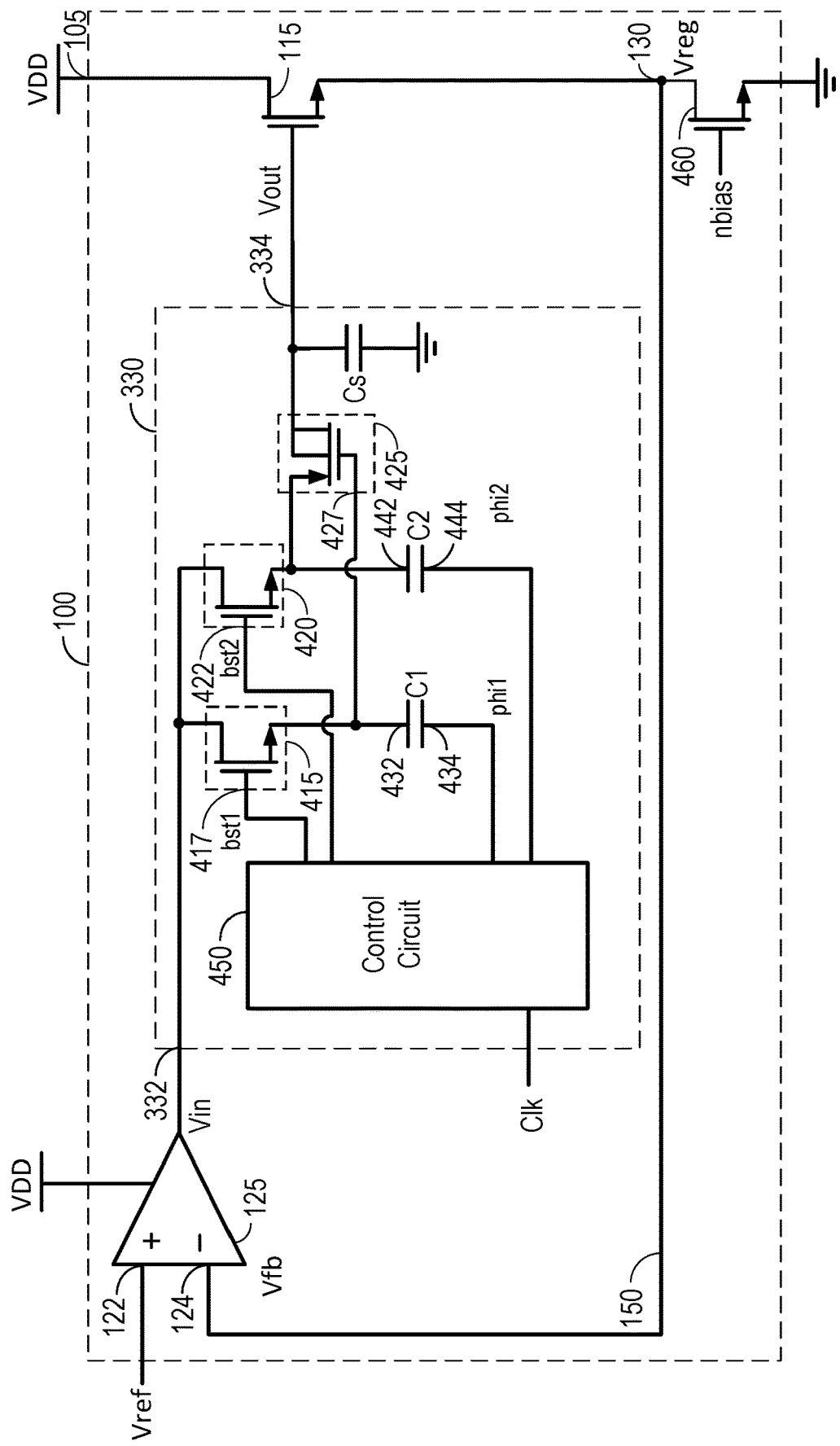
FIG. 4 shows an exemplary implementation of the voltage booster according to certain aspects of the present disclosure.

FIG. 4 shows an exemplary implementation of the voltage booster 330 according to certain aspects of the present disclosure. In this example, the voltage booster 330 includes a first switch 415, a second switch 420, a third switch 425, a first capacitor C1, a second capacitor C2, an output capacitor Cs, and a control circuit 450.

The first switch 415 is coupled between the input 332 of the voltage booster 330 and a first terminal 432 of the first capacitor C1, and the second switch 420 is coupled between the input 332 of the voltage booster 330 and a first terminal 442 of the second capacitor C2. The control circuit 450 is coupled to a second terminal 434 of the first capacitor C1 and a second terminal 444 of the second capacitor C2. As discussed further below, the control circuit 450 applies control signal phi1 to the second terminal 434 of the first capacitor C1 to selectively boost the voltage at the first terminal 432 of the first capacitor C1, and applies control signal phi2 to the second terminal 444 of the second capacitor C2 to selectively boost the voltage at the first terminal 442 of the second capacitor C2. The controls signals phi1 and phi2 may also be referred to as boosting voltages.

In the example in FIG. 4, the control circuit 450 is coupled to a control input 417 of the first switch 415 and a control input 422 of the second switch 420. As discussed further below, the control circuit 450 inputs control signal bst1 to the control input 417 of the first switch 415 to selectively open and close the first switch 415, and inputs control signal bst2 to the control input 422 of the second switch 420 to selectively open and close the second switch 420. As used herein, a "control input" of a switch is an input that controls whether the switch is closed or open based on a signal (e.g., voltage) input to the control input.

In the example in FIG. 4, the first switch 415 is implemented with an NFET having a drain coupled to the input 332 of the voltage booster 330 and a source coupled to the first terminal 432 of the first capacitor C1, in which the control input 417 of the first switch 415 is located at a gate of the NFET. The second switch 420 is implemented with an NFET having a drain coupled to the input 332 of the voltage booster 330 and a source coupled to the first terminal 442 of the second capacitor C2, in which the control input 422 of the second switch 420 is located at a gate of the NFET. It is to be appreciated that the present disclosure is not limited to this example, and that each of the first and second switches 415 and 420 may be implemented with another type of transistor, a transmission gate, etc.

The third switch 425 is coupled between the first terminal 442 of the second capacitor C2 and the output 334 of the voltage booster 330. A control input 427 of the third switch 425 is coupled to the first terminal 432 of the first capacitor C1. Thus, in this example, the third switch 425 is controlled by the voltage at the first terminal 432 of the first capacitor C1. The output capacitor Cs is coupled between the output 334 of the voltage booster 330 and ground.

In the example in FIG. 4, the third switch 425 is implemented with a PFET having a drain coupled to the output 334 of the voltage booster 330 and a source coupled to the first terminal 442 of the second capacitor C2, in which the control input 427 of the third switch 425 is located at a gate of the PFET. As discussed further below, the voltage at the first terminal 432 of the first capacitor C1 controls whether the third switch 425 is open or closed. It is to be appreciated that the present disclosure is not limited to this example, and that the third switch 425 may be implemented with another type of transistor, a transmission gate, etc.

The control circuit 450 receives a clock signal (denoted "Clk"), and generates the control signals bst1, bst2, phi1, and phi2 based on the clock signal Clk. The clock signal Clk may come from an oscillator, a phase locked loop (PLL), and/or another clock source. In certain aspects, the frequency of the clock signal Clk may vary over a wide frequency range (e.g., between 20 MHz and 100 MHz).

Figure 5:
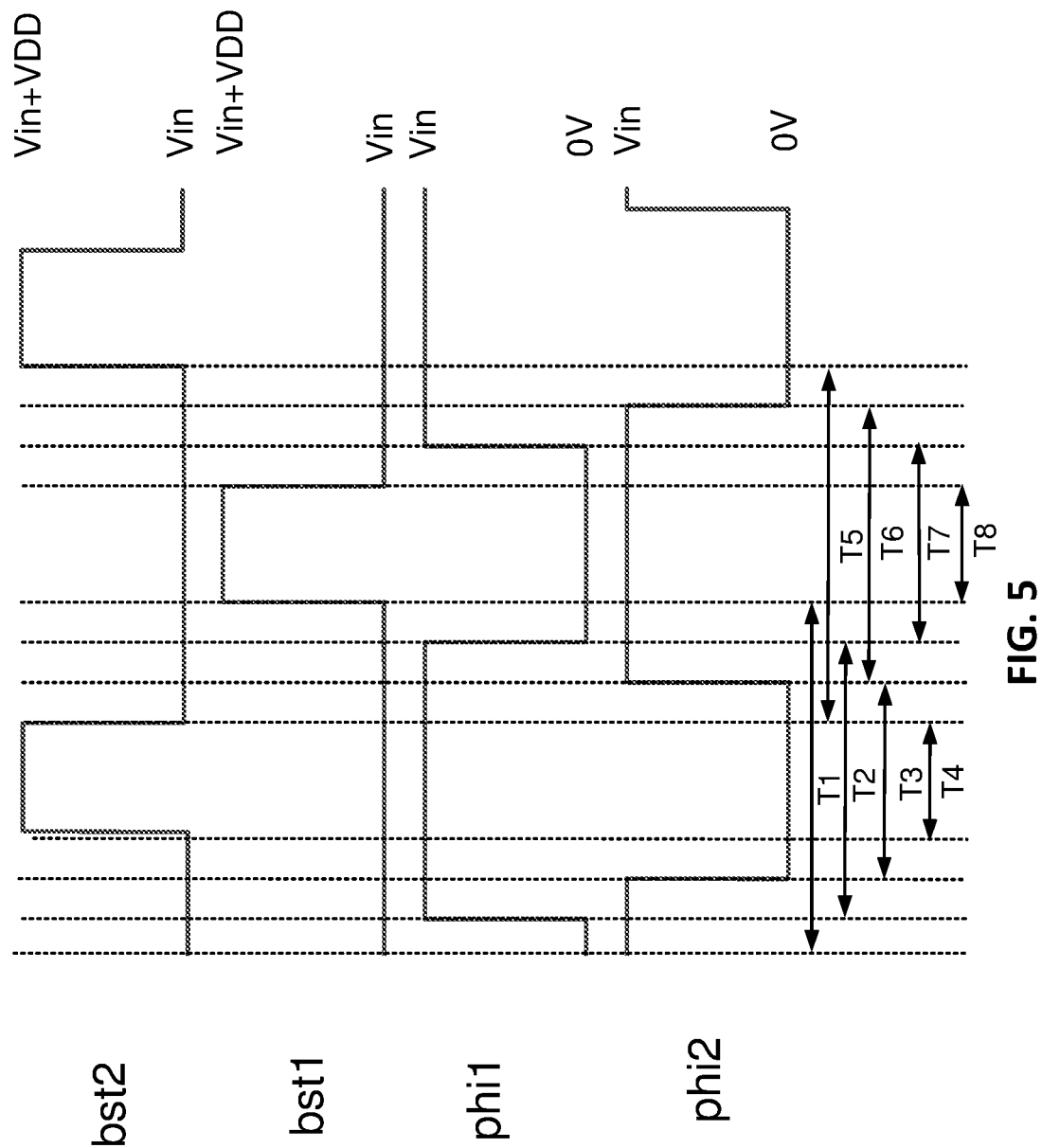
FIG. 5 is a timing diagram illustrating exemplary signals in the voltage booster of FIG. 4 according to certain aspects of the present disclosure.

Exemplary operations of the voltage booster 330 shown in FIG. 4 will now be described with reference to FIG. 5 according to certain aspects. FIG. 5 is a timing diagram showing an example of the control signals bst1, bst2, phi1, and phi2 generated by the control circuit 450. In this example, the control signals bst1, bst2, phi1, and phi2 are periodic signals having the same frequency. The frequency of the control signals may be equal to the frequency of the clock signal Clk. Each of the control signals phi1 and phi2 swings between the input voltage Vin of the voltage booster 330 and approximately zero volts. Each of the control signals bst2 and bst1 swings between Vin and Vin+VDD.

During time period T1, the voltage of control signal bst1 is Vin. As a result, the first switch 415 is turned off (i.e., open), which isolates the first capacitor C1 from the input 332 of the voltage booster 330.

During time period T2 (which is within time period T1), the voltage of control signal phi1 is Vin. As a result, control signal phi1 boosts the voltage at the first terminal 432 of the first capacitor C1 by Vin. Assuming the first capacitor C1 was previously charged to Vin, the boosted voltage at the first terminal 432 of the first capacitor C1 is approximately equal to 2Vin (i.e., double Vin). Since the control input 427 (e.g., gate) of the third switch 425 is coupled to the first terminal 432 of the first capacitor C1 (as shown in FIG. 4), the voltage of 2Vin is applied to the control input 427 of the third switch 425, which turns off (i.e., opens) the third switch 425 in this example. Thus, during time T2, the second capacitor C2 is isolated from the output capacitor Cs.

During time period T3 (which is within time period T2), the voltage of control signal phi2 is approximately zero volts. As a result, the voltage at the first terminal 442 of the second capacitor C2 is not boosted.

During time period T4 (which is within time period T3), the voltage of control signal bst2 is Vin+Vdd, which turns on (i.e., closes) the second switch 420. This allows charge to flow between the output of the error amplifier 125 and the first terminal 442 of the second capacitor C2 through the second switch 420.

During time period T5, the voltage of control signal bst2 is Vin. As a result, the second switch 420 is turned off (i.e., open), and the second capacitor C2 is isolated from the input 332 of the voltage booster 330.

During time period T6 (which is within time period T5), the voltage of control signal phi2 is Vin. As a result, the control signal phi2 boosts the voltage at the first terminal 442 of the second capacitor C2 by Vin. Since the second capacitor C2 was previously charged to Vin, the boosted voltage at the first terminal 442 of the second capacitor C2 is approximately equal to 2Vin (i.e., double Vin).

During time period T7 (which is within time period T6), the voltage of control signal phi1 is approximately zero volts. As a result, the voltage at the first terminal 432 of the first capacitor C1 is not boosted and is approximately equal to Vin. Since the control input 427 (e.g., gate) of the third switch 425 is coupled to the first terminal 432 of the first capacitor C1, the voltage of Vin is applied to the control input 427 of the third switch 425, which turns on (i.e., closes) the third switch 425 in this example. As a result, the second capacitor C2 is coupled to the output capacitor Cs through the second switch 420, allowing charge to flow between the second capacitor C2 and the output capacitor Cs. During the charge transfer, the voltage at the first terminal 442 of the second capacitor C2 is boosted by control signal phi2.

During time period T8 (which is within time period T7), the voltage of control signal bst1 is Vin+VDD, which turns on the first switch 415. This allows charge to flow between the output of the error amplifier 125 and the first terminal 432 of the first capacitor C1 through the first switch 415.

In this example, during each cycle (i.e., period) of the clock signal Clk, charge is transferred between the second capacitor C2 and the output capacitor Cs while the voltage of the second capacitor C2 is boosted. This enables the voltage at the output 334 of the voltage booster 330 to be boosted to a voltage approximately equal to 2Vin (i.e., double the input voltage to the voltage booster 330).

It is to be appreciated that charge transfer between the second capacitor C2 and the output capacitor Cs may be in either direction. For example, if the amplifier 125 increases Vin (e.g., in response to an increase in the current load), then charge may be transferred from the second capacitor C2 to the output capacitor Cs to increase the boosted voltage. If, on the other hand, the amplifier 125 decreases Vin (e.g., in response to a decrease in the current load), then charge may be transferred from the output capacitor Cs to the second capacitor C2 to decrease the boosted voltage to reflect the decrease in Vin. Accordingly, in this disclosure, it is to be understood that charge transfer may be in either direction unless specified otherwise.

In this example, charge is transferred between the second capacitor C2 and the output capacitor Cs once per cycle of the clock signal Clk. The output capacitor Cs is used to store charge at the output 334 of the voltage booster 330 to help maintain the boosted voltage at the output 334 between charge transfers. In certain aspects, the output capacitor Cs may be omitted. In these aspects, the gate capacitor of the pass NFET 115 may be used as an output capacitor to store charge from the second capacitor C2.

In the example in FIG. 4, the LDO regulator 100 includes a NFET 460 coupled between the output 130 of the LDO regulator 100 and ground, in which the gate of the NFET 460 is biased by a bias voltage (denoted "nbias"). In this example, the bias voltage turns on the NFET 460 so that the NFET 460 draws a small amount of current from the output 130. The small amount of current may be approximately equal to a minimum amount of current needed for the LDO regulator 100 to maintain voltage regulation. This allows the LDO regulator 100 to maintain voltage regulation when the LDO regulator 100 is not sourcing enough current to a load (not shown in FIG. 4) to maintain regulation. It is to be appreciated that the NFET 460 may be omitted in some implementations. Note that the circuit coupled to the output 130 of the LDO regulator 100 is not explicitly shown in FIG. 4.

In the example in FIG. 4, charge is transferred between the second capacitor C2 and the output capacitor Cs once per cycle of the clock signal Clk. The voltage of the first capacitor C1 is used to control the third switch 425, in which the third switch 425 turns on when the voltage of the first capacitor C1 is not boosted and turns off when the voltage of the first capacitor C1 is boosted.

In certain aspects, the voltage booster 330 may employ a double charge pumping architecture in which charge is transferred to/from the output capacitor Cs twice per cycle (i.e., period) of the clock signal Clk. This allows the same amount of charge to be transferred to/from the output capacitor Cs per clock cycle using smaller capacitors, which reduces the area of the LDO regulator 100. In addition, transferring charge to/from the output capacitor Cs twice per clock cycle improves the settling time of the LDO regulator 100. The term "to/from" indicates that the charge transfer may be in either direction (e.g., depending on whether the amplifier 125 increases or decreases Vin in response to a change in the current load).

Figure 6:
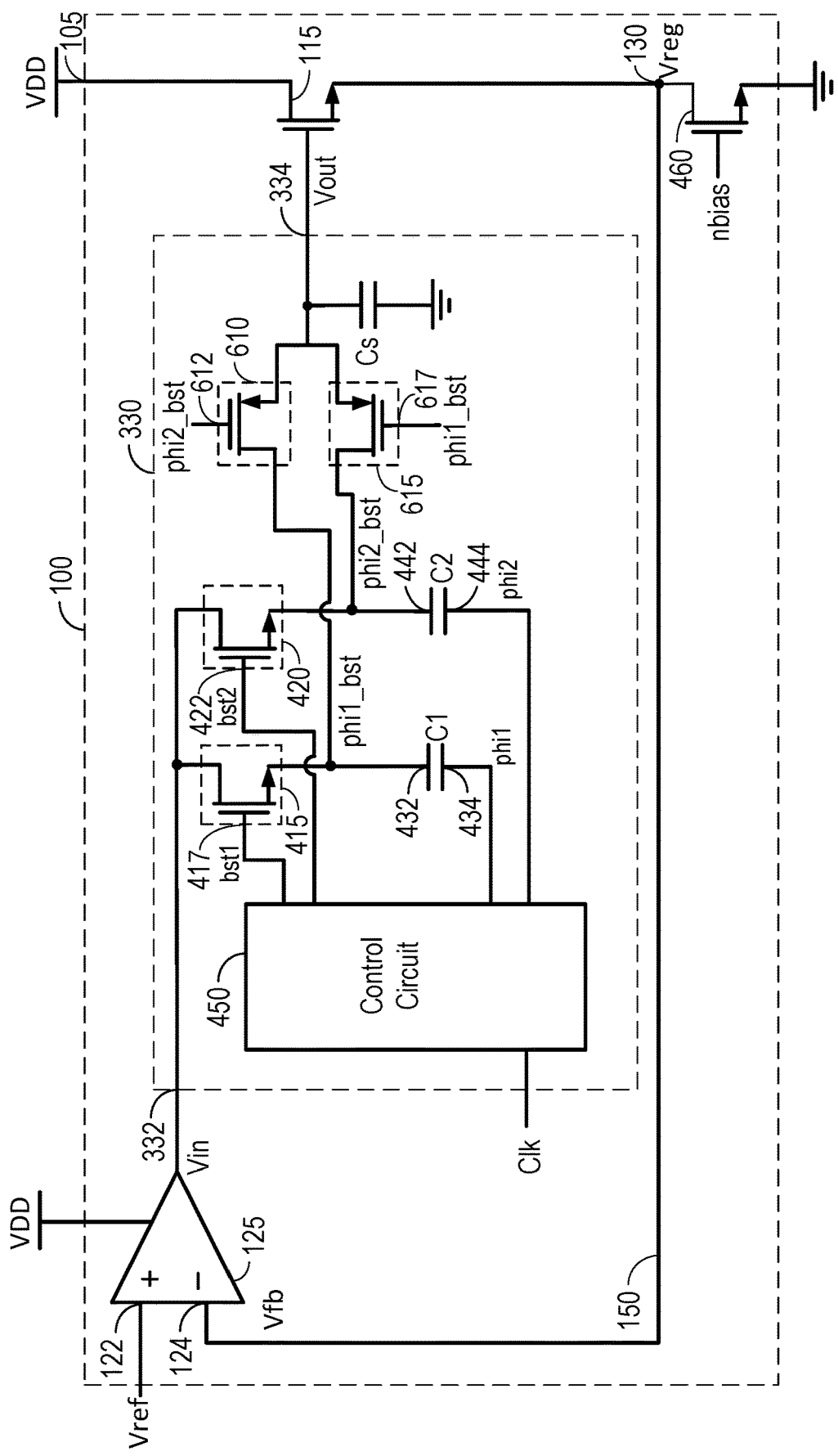
FIG. 6 shows another exemplary implementation of the voltage booster according to certain aspects of the present disclosure.

In this regard, FIG. 6 shows an example in which the voltage booster 330 employs a double charge pumping architecture according to certain aspects of the present disclosure. In this example, the voltage booster 330 includes the first switch 415, the second switch 420, the first capacitor C1, the second capacitor C2, the output capacitor Cs, and the control circuit 450 discussed above. In addition, the voltage booster 330 includes a third switch 610 and a fourth switch 615. As discussed further below, the third switch 610 and the fourth switch 615 are used to alternately transfer charge between the first capacitor C1 and the output capacitor Cs and transfer charge between the second capacitor C2 and the output capacitor Cs for double charge pumping.

The first switch 415 is coupled between the input 332 of the voltage booster 330 and the first terminal 432 of the first capacitor C1, and the second switch 420 is coupled between the input 332 of the voltage booster 330 and the first terminal 442 of the second capacitor C2. The second terminal 434 of the first capacitor C1 is coupled to the control circuit 450, and the second terminal 444 of the second capacitor C2 is coupled to the control circuit 450. As discussed above, the control circuit 450 applies control signal phi1 to the second terminal 434 of the first capacitor C1 and applies control signal phi2 to the second terminal 444 of the second capacitor C2. In the example in FIG. 6, each of the first and second switches 415 and 420 is implemented with an NFET. However, it is to be appreciated that each of the switches 415 and 420 may be implemented with another type of transistor, a transmission gate, etc. As discussed above, the control circuit 450 inputs control signal bst1 to the control input 417 of the first switch 415 and inputs control signal bst2 to the control input 422 of the second switch 420.

The third switch 610 is coupled between the first terminal 432 of the first capacitor C1 and the output 334 of the voltage booster 330, in which a control input 612 of the third switch is coupled to the first terminal 442 of the second capacitor C2. Thus, in this example, the third switch 610 is controlled by the voltage at the first terminal 442 of the second capacitor C2 (labeled "phi2_bst" in FIG. 6). Note that in FIG. 6, the connection between the control input 612 of the third switch 610 and the first terminal 442 of the second capacitor C2 is not explicitly shown for ease of illustration. In the example in FIG. 6, the third switch 610 is implemented with a PFET in which the control input 612 of the third switch 610 is located at a gate of the PFET. However, it is to be appreciated that the third switch 610 is not limited to this example.

The fourth switch 615 is coupled between the first terminal 442 of the second capacitor C2 and the output 334 of the voltage booster 330, in which a control input 617 of the fourth switch 615 is coupled to the first terminal 432 of the first capacitor C1. Thus, in this example, the fourth switch 615 is controlled by the voltage at the first terminal 432 of the first capacitor C1 (labeled "phi1_bst" in FIG. 6). Note that in FIG. 6, the connection between the control input 617 of the fourth switch 615 and the first terminal 432 of the first capacitor C1 is not explicitly shown for ease of illustration. In the example in FIG. 6, the fourth switch 615 is implemented with a PFET in which the control input 617 of the fourth switch 615 is located at a gate of the PFET. However, it is to be appreciated that the fourth switch 615 is not limited to this example.

As discussed above, the control circuit 450 receives the clock signal (denoted "Clk"), and generates the control signals bst1, bst2, phi1, and phi2 based on the clock signal Clk.

Figure 7:
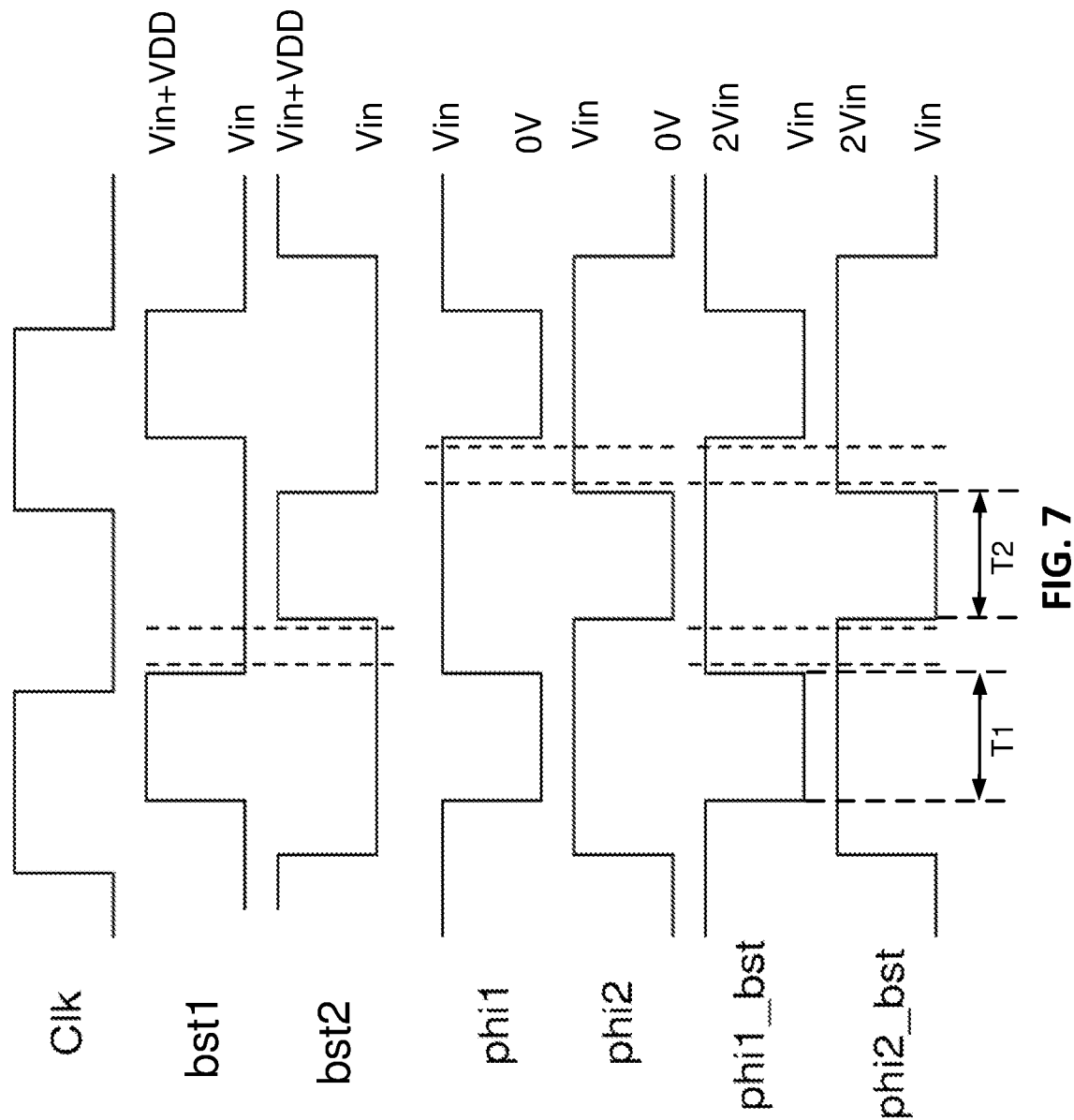
FIG. 7 is a timing diagram illustrating exemplary signals in the voltage booster of FIG. 6 according to certain aspects of the present disclosure.

Exemplary operations of the voltage booster 330 will now be described with reference to FIG. 7 according to certain aspects. FIG. 7 is a timing diagram showing an example of the control signals bst1, bst2, phi1, and phi2 generated by the control circuit 450. In this example, the control signals bst1, bst2, phi1, and phi2 are periodic signals having the same frequency (e.g., the frequency of the clock signal Clk). Each of the control signals phi1 and phi2 swings between the input voltage Vin of the voltage booster 330 and approximately zero volts. Each of the control signals bst2 and bst1 swings between Vin and Vin+VDD. In the example in FIG. 7, each of the first and second switches 415 and 420 is implemented with an NFET, and each of the third and fourth switches 610 and 615 is implemented with a PFET.

FIG. 7 also shows an example of the voltage phi1_bst at the first terminal 432 of the first capacitor C1, and the voltage phi2_bst at the first terminal 424 of the second capacitor C2. In the example in FIG. 7, each of the voltages phi1_bst and phi2_bst swings between approximately Vin and 2Vin.

In the example in FIG. 7, it is assumed that the charge transfer for each of the first and second capacitors C1 and C2 during a single clock cycle (i.e., period) is relatively small. This assumption may be valid in a steady state condition where there are no sudden large changes in the current load. Based on this assumption, small changes in the voltages of the first and second capacitors C1 and C2 due to small charge transfers in a single clock cycle are neglected to simplify the discussion of FIG. 7.

During time period T1, charge is transferred between the second capacitor C2 and the output capacitor Cs. More particularly, during time period T1, the control circuit 450 applies a voltage boosting voltage of approximately Vin to the second terminal 444 of the second capacitor C2 to boost the voltage at the first terminal 442 of the second capacitor C2 by setting control signal phi2 to approximately Vin. Also, during time period T1, the control circuit 450 turns off (i.e., opens) the second switch 420 by setting control signal bst2 to approximately Vin, and the fourth switch 615 is turned on (i.e., closed) by voltage phi1_bst. This allows charge to flow between the second capacitor C2 and the output capacitor Cs through the fourth switch 615 while the voltage of the second capacitor C2 is boosted.

Also, during the time period T1, the third switch 610 is turned off by voltage phi2_bst and the control circuit 450 turns on (i.e., closes) the first switch 415 by setting control signal bst1 to approximately Vin+Vdd, allowing charge to flow between the output of the error amplifier 125 and the first capacitor C1. During this time, the voltage of the first capacitor C1 is not boosted.

Thus, during time period T1, charge is transferred between the second capacitor C2 and the output capacitor Cs.

During time period T2, charge is transferred between the first capacitor C1 and the output capacitor Cs. More particularly, during time period T2, the control circuit 450 applies a voltage boosting voltage of approximately Vin to the second terminal 434 of the first capacitor C1 to boost the voltage at the first terminal 432 of the first capacitor C1 by setting control signal phi1 to approximately Vin. Also, during time period T2, the control circuit turns off (i.e., opens) the first switch 415 by setting control signal bst1 to approximately Vin, and the third switch 610 is turned on (i.e., closed) by voltage phi2_bst. This allows charge to flow between the first capacitor C1 and the output capacitor Cs through the third switch 610 while the voltage of the first capacitor C1 is boosted.

Also, during the time period T2, the fourth switch 615 is turned off by voltage phi1_bst and the control circuit 450 turns on (i.e., closes) the second switch 420 by setting control signal bst2 to approximately Vin+VDD, allowing charge to flow between the output of the error amplifier 125 and the second capacitor C2. During this time, the voltage of the second capacitor C2 is not boosted.

Thus, during time period T2, charge is transferred between the first capacitor C1 and the output capacitor Cs.

In this example, charge is transferred to/from the output capacitor Cs twice during one clock cycle (i.e., period). During a first portion of the clock cycle (e.g., time period T1), charge is transferred between the second capacitor C2 and the output capacitor Cs, and, during a second portion of the clock cycle (e.g., time period T2), charge is transferred between the first capacitor C1 and the output capacitor Cs.

The double charge transfer per clock cycle improves the settling time of the LDO regulator 100 and allows the same amount of charge to be transferred to/from the output capacitor Cs per clock cycle using smaller capacitors. For example, the sizes of the first and second capacitors C1 and C2 may be reduced by approximately half while still transferring approximately the same amount of charge to/from the output capacitor Cs per clock cycle.

In the example in FIG. 6, the third switch 610 is implemented with a PFET in which the source of the PFET is coupled to the output capacitor Cs and the drain of the PFET is coupled to the first capacitor C1. In this example, when turned on by voltage phi2_bst, the third switch 610 may transfer charge from the first capacitor C1 to the output capacitor Cs when the drain voltage is higher than the source voltage and transfer charge from the output capacitor Cs to the first capacitor C1 when the source voltage is higher than the drain voltage.

Also, in the example in FIG. 6, the fourth switch 615 is implemented with a PFET in which the source of the PFET is coupled to the output capacitor Cs and the drain of the PFET is coupled to the second capacitor C2. In this example, when turned on by voltage phi1_bst, the fourth switch 615 may transfer charge from the second capacitor C2 to the output capacitor Cs when the drain voltage is higher than the source voltage and transfer charge from the output capacitor Cs to the second capacitor C2 when the source voltage is higher than the drain voltage.

Although the voltages of the capacitors C1 and C2 are boosted by a boosting voltage of Vin in the above example, it is to be appreciated that the present disclosure is not limited to this example and that the boosting voltage may have another voltage besides Vin.

Figure 8:
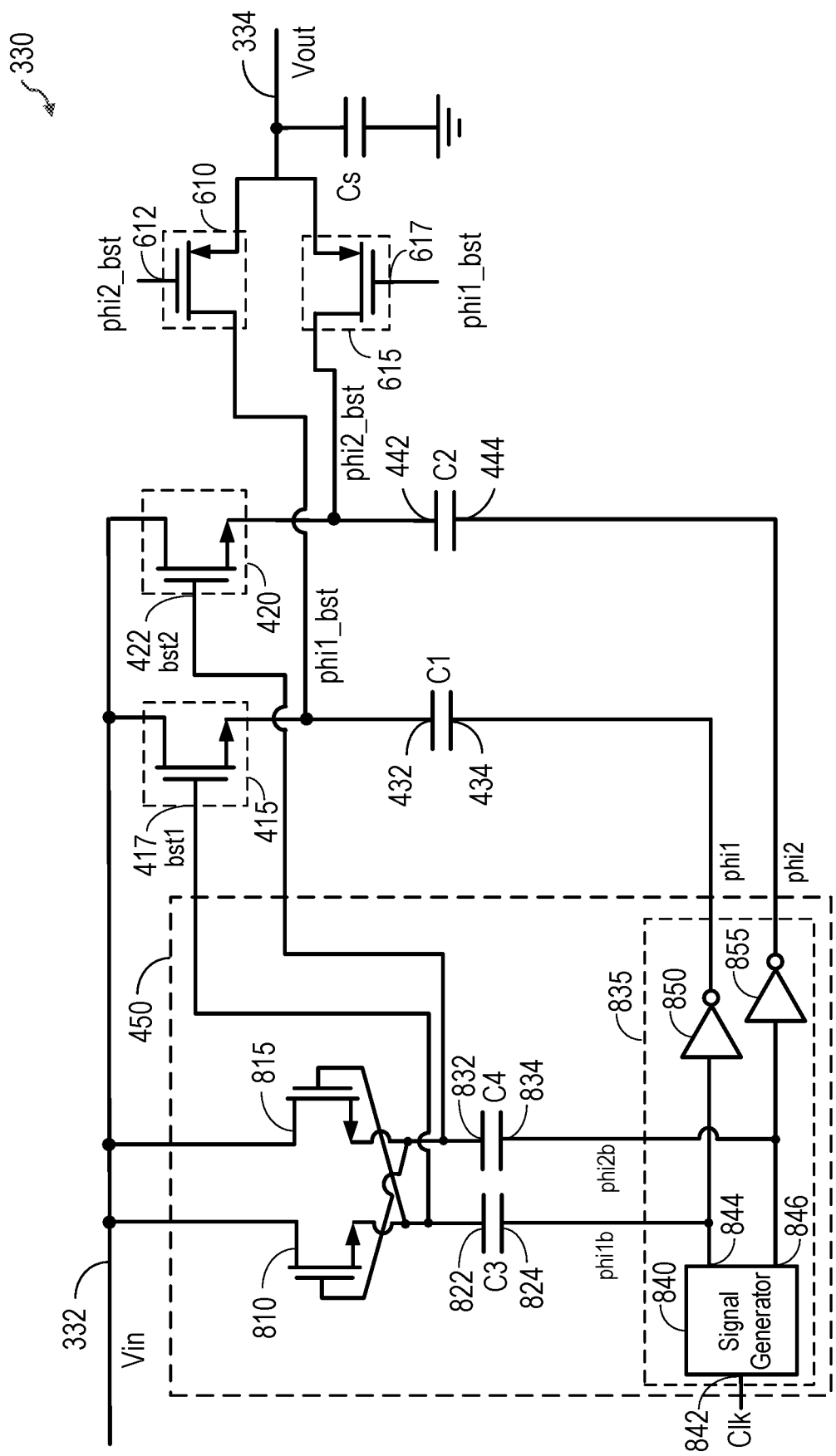
FIG. 8 shows an exemplary implementation of a control circuit according to certain aspects of the present disclosure.

FIG. 8 shows an exemplary implementation of the control circuit 450 according to certain aspects of the present disclosure. As discussed above, the control circuit 450 generates control signals bst1 and bst2 for controlling the first and second switches 415 and 420, respectively. In the example shown in FIG. 8, the control circuit 450 includes a first NFET 810, a second NFET 815, a third capacitor C3, a fourth capacitor C4, and a voltage boosting circuit 835. The drains of the first and second NFETs 810 and 815 are coupled to the input 332 of the voltage booster 330. The first and second NFETs 810 and 815 are cross-coupled in which the gate of the first NFET 810 is coupled to the source of the second NFET 815, and the gate of the second NFET 815 is coupled to the source of the first NFET 810. A first terminal 822 of the third capacitor C3 is coupled to the source of the first NFET 810, and a first terminal 832 of the fourth capacitor C4 is coupled to the source of the second NFET 815.

The voltage boosting circuit 835 is configured to alternately boost the voltage of the third capacitor C3 and the voltage of the fourth capacitor C4 by alternately applying a boosting voltage to the second terminal 824 of the third capacitor C3 and the second terminal 834 of the fourth capacitor C4. The boosting voltage may be VDD or another voltage.

Figure 9:
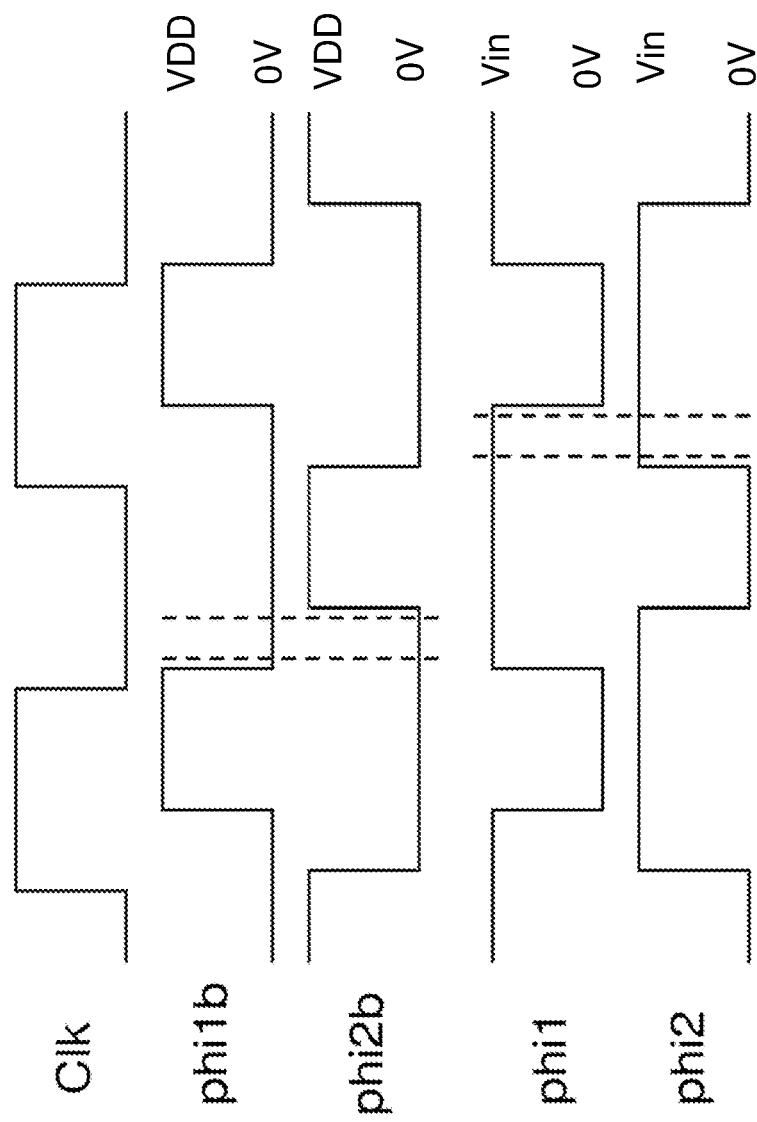
FIG. 9 is a timing diagram illustrating exemplary control signals generated by the control circuit according to certain aspects of the present disclosure.

In this example, the voltage boosting circuit 835 includes a signal generator 840. The signal generator 840 has an input 842 configured to receive the clock signal Clk, a first output 844 coupled to a second terminal 824 of the third capacitor C3, and a second output 846 coupled to a second terminal 834 of the fourth capacitor C4. The signal generator 840 is configured to generate control signals phi1b and phi2b, output signal phi1b to the second terminal 824 of the third capacitor C3 via the first output 844, and output signal phi2b to the second terminal 834 of the fourth capacitor C4 via the second output 846. FIG. 9 shows an exemplary timing diagram of signals phi1b and phi2b, in which each of the signals phi1b and phi2b swings between VDD and approximately zero volts.

Control signal bst1 is taken at the first terminal 822 of the third capacitor C3. Thus, in this example, the voltage of the control signal bst1 is equal to the voltage at the first terminal 822 of the third capacitor C3. Control signal bst2 is taken at the first terminal 832 of the fourth capacitor C4. Thus, in this example, the voltage of the control signal bst2 is equal to the voltage at the first terminal 832 of the fourth capacitor C4.

During operation, the voltages of signals phi1b and phi2b alternately swing to VDD. When the voltage of signal phi1b is VDD and the voltage of signal phi2b is low (e.g., approximately zero volts), the first NFET 810 is turned off and the second NFET 815 is turned on. The voltage at the first terminal 822 of the third capacitor C3 (and hence the voltage of control signal bst1) is boosted to a voltage approximately equal to the sum of Vin and VDD (i.e., Vin+VDD). As a result, the first switch 415 is turned on. The boosted voltage at the first terminal 822 of the third capacitor C3 (which is also coupled to the gate of the second NFET 815) turns on the second NFET 815. As a result, charge flows between the fourth capacitor C4 and the output of the error amplifier 125 through the second NFET 815. During this time, the voltage of the first terminal 832 of the fourth capacitor C4 is not boosted since signal phi2b is low. Thus, the voltage of control signal bst2 does not exceed Vin, which turns off the second switch 420.

When the voltage of signal phi1b is low (e.g., approximately zero volts) and the voltage of signal phi2b is VDD, the first NFET 810 is turned on and the second NFET 815 is turned off. The voltage at the first terminal 832 of the fourth capacitor C4 (and hence the voltage of control signal bst2) is boosted to a voltage approximately equal to Vin+VDD, which turns on the second switch 420. The boosted voltage at the first terminal 832 of the fourth capacitor C4 (which is also coupled to the gate of the first NFET 810) also turns on the first NFET 810. As a result, charge flows between the third capacitor C3 and the output of the error amplifier 125 through the first NFET 810. During this time, the voltage of the first terminal 822 of the third capacitor C3 (and hence the voltage of control signal bst1) does not exceed Vin, which turns off the first switch 415.

In the example in FIG. 8, the voltage boosting circuit 835 also includes a first inverter 850 coupled between the first output 844 of the signal generator 840 and the second terminal 434 of the first capacitor C1, and a second inverter 855 coupled between the second output 846 of the signal generator 840 and the second terminal 444 of the second capacitor C2. In this example, the first inverter 850 is configured to generate signal phi1 by inverting signal phi1b from the signal generator 840, and the second inverter 855 is configured to generate signal phi2 by inverting the signal phi2b from the signal generator 840. In certain aspects, each of the inverters 850 and 855 is powered by the voltage input to the voltage booster 330 so that the voltage of each of the signals phi1 and phi2 swings between Vin and approximately zero volts.

Figure 10:
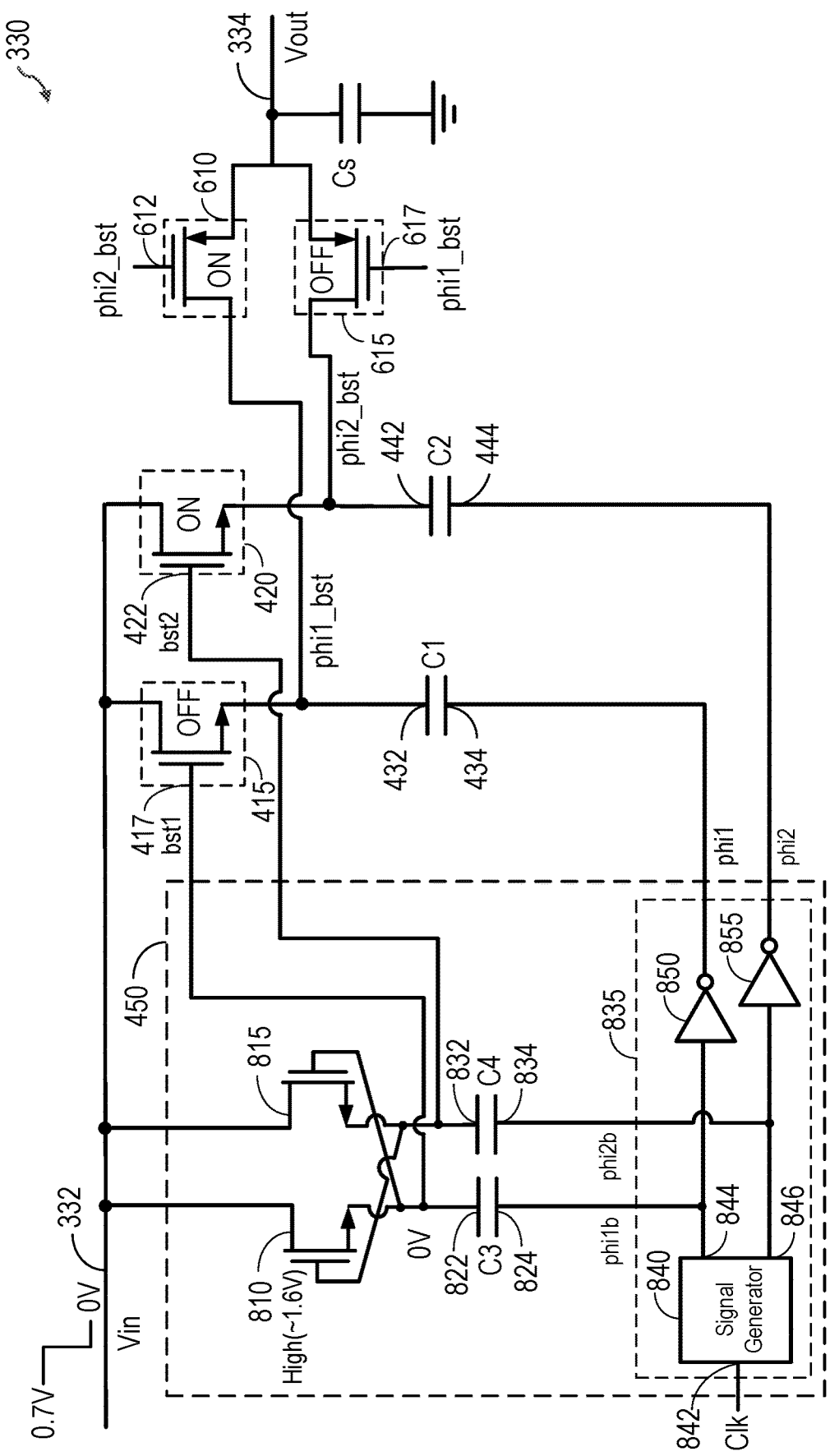
FIG. 10 shows an example of a latch-up state in the voltage booster according to certain aspects of the present disclosure.

The voltage booster 330 may enter a latched state under certain conditions. For example, the voltage booster 330 may enter a latched state when the current load at the output 130 suddenly drops. This may occur, for example, when a circuit coupled to the output 130 is turned off. The sudden drop in the current load may cause the regulated voltage Vreg to suddenly increase by a large amount, which causes the feedback voltage Vfb input to the error amplifier 125 to suddenly increase by a large amount. In response to the sudden large increase in the feedback voltage Vfb, the output voltage of the error amplifier 125 may suddenly drop to approximately zero volts. An example of this is illustrated in FIG. 10 in which the input voltage Vin to the voltage booster 330 from the error amplifier 125 drops abruptly from approximately 0.7V to approximately zero volts due to the sudden drop in the current load. Although the voltage before the drop is approximately 0.7V in this example, it is to be appreciated that the voltage before the drop may be different based on the loading condition of the LDO regulator 100 before the drop. Note that the error amplifier 125 is not shown in FIG. 10.

In this case, the sudden drop in Vin to approximately zero volts may cause the voltage booster 330 to enter a latched state as follows. In the case where the first NFET 810 is turned on at the time of the voltage drop, the third capacitor C3 is quickly discharged to approximately zero volts, causing the gate voltage of the second NFET 815 and the voltage of the control signal bst1 to drop to approximately zero volts. As a result, the second NFET 815 and the first switch 415 are turned off. Since the second NFET 815 is turned off, the voltage at the first terminal 832 of the fourth capacitor C4 stays high (e.g., approximately 1.6V). As a result, the first NFET 810 and the second switch 420 are turned on. Also, the third switch 610 is turned on and the fourth switch 615 is turned off. In FIG. 10, a switch that is turned off is indicated by "OFF" next to the switch and a switch that is turned on is indicated by "ON" next to the switch.

In this example, there is no discharge current path from the output capacitor Cs to the output of the error amplifier 125. This is because the first switch 415 is turned off, which blocks a discharge current path through the third switch 610 and the first switch 415, and, the fourth switch 615 is turned off, which blocks a discharge current path through the fourth switch 615 and the second switch 420. Because there is no discharge current path from the output capacitor Cs to the output of the error amplifier 125, the voltage at the output capacitor Cs may stay high, causing the voltage booster 330 to persist in the latched state.

The latched state may lead to over voltage violations in the voltage booster 330. An over voltage violation occurs when the voltage between two terminals of a transistor exceeds a voltage limit. In one example, the voltage limit may be approximately 1.3V. In this example, the gate voltage of approximately 1.6V at the gate of the first NFET 810 leads to an over voltage violation at the first NFET 810 since the voltage between the gate and the drain of the first NFET 810 exceeds the voltage limit and the voltage between the gate and the source of the first NFET 810 exceeds the voltage limit. The transistors in the switches may also experience over voltage violations. The over voltage violations may persist until the voltage booster 330 recovers from the latched state.

Figure 11:
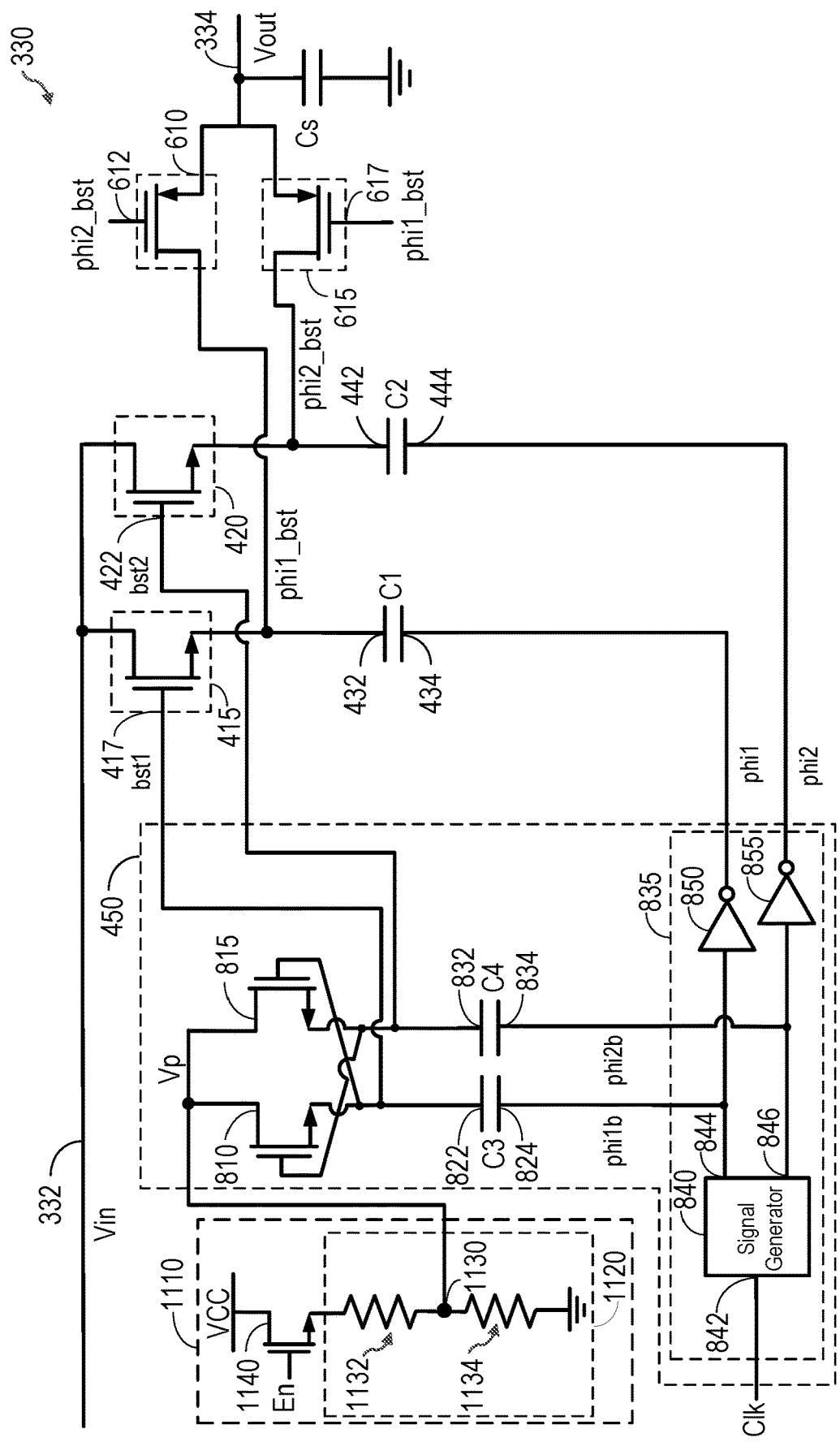
FIG. 11 shows an example of a circuit configured to prevent latch-up in a voltage booster according to certain aspects of the present disclosure.

To address latch-up, aspects of the present disclosure couple the control circuit 450 to a voltage source (e.g., fixed voltage source) instead of the input 332 of the voltage booster 330. In this regard, FIG. 11 shows an example of a voltage source 1110 coupled to the control circuit 450, and, more particularly, the drains of the NFETs 810 and 815. The voltage source 1110 provides the control circuit 450 with a voltage Vp that is independent of the input voltage Vin provided by the output of the error amplifier 125. Thus, when the input voltage Vin suddenly drops to approximately zero volts (e.g., due to a sudden drop in the current load), the voltage Vp from the voltage source 1110 does not drop, which helps prevent the voltage booster 330 from entering the latched state. The voltage Vp may be set to a voltage level that enables the control circuit 450 to alternately turn on the first switch 415 and the second switch 420 while avoiding over voltage violations.

FIG. 11 shows an exemplary implementation of the voltage source 1110 in which the voltage source 1110 includes a voltage divider 1120 and an enable transistor 1140. The enable transistor 1140 is coupled between a supply rail with a supply voltage VCC and the voltage divider 1120, and the voltage divider 1120 is coupled between the enable transistor 1140 and ground. The supply voltage VCC may be different than the supply voltage VDD coupled to the input 105 of the LDO regulator 100. In certain aspects, the supply voltage VCC may be lower than the supply voltage VDD.

In this example, the enable transistor 1140 is configured to selectively enable or disable the voltage source 1110 based on an enable signal En input to the gate of the enable transistor 1140. When the enable transistor 1140 is turned on by the enable signal En, the enable transistor 1140 couples the voltage divider 1120 to the supply voltage VCC, and the voltage source 1110 is enabled. When the enable transistor 1140 is turned off by the enable signal En, the voltage source 1110 is disabled. In the example in FIG. 11, the enable transistor 1140 is implemented with an NFET. However, it is to be appreciated that the enable transistor 1140 may be implemented with another type of transistor.

In this example, the voltage divider 1120 includes a first resistor 1132 and a second resistor 1134 coupled in series between the enable transistor 1140 and ground. The voltage Vp is generated at the node 1130 between the first resistor 1132 and the second resistor 1134. The node 1130 is coupled to the drains of the NFETs 810 and 815 in the example in FIG. 11. In this example, the voltage Vp is given by:

$$Vp = \left(\frac{R2}{R1+R2}\right) \cdot VCC \quad (3)$$

where R1 and R2 in equation (3) are the resistances of the first resistor 1132 and the second resistor 1134, respectively. Thus, in this example, the voltage Vp may be set to a desired voltage by setting the ratio of the resistances of resistors 1132 and 1134 accordingly.

Figure 12:
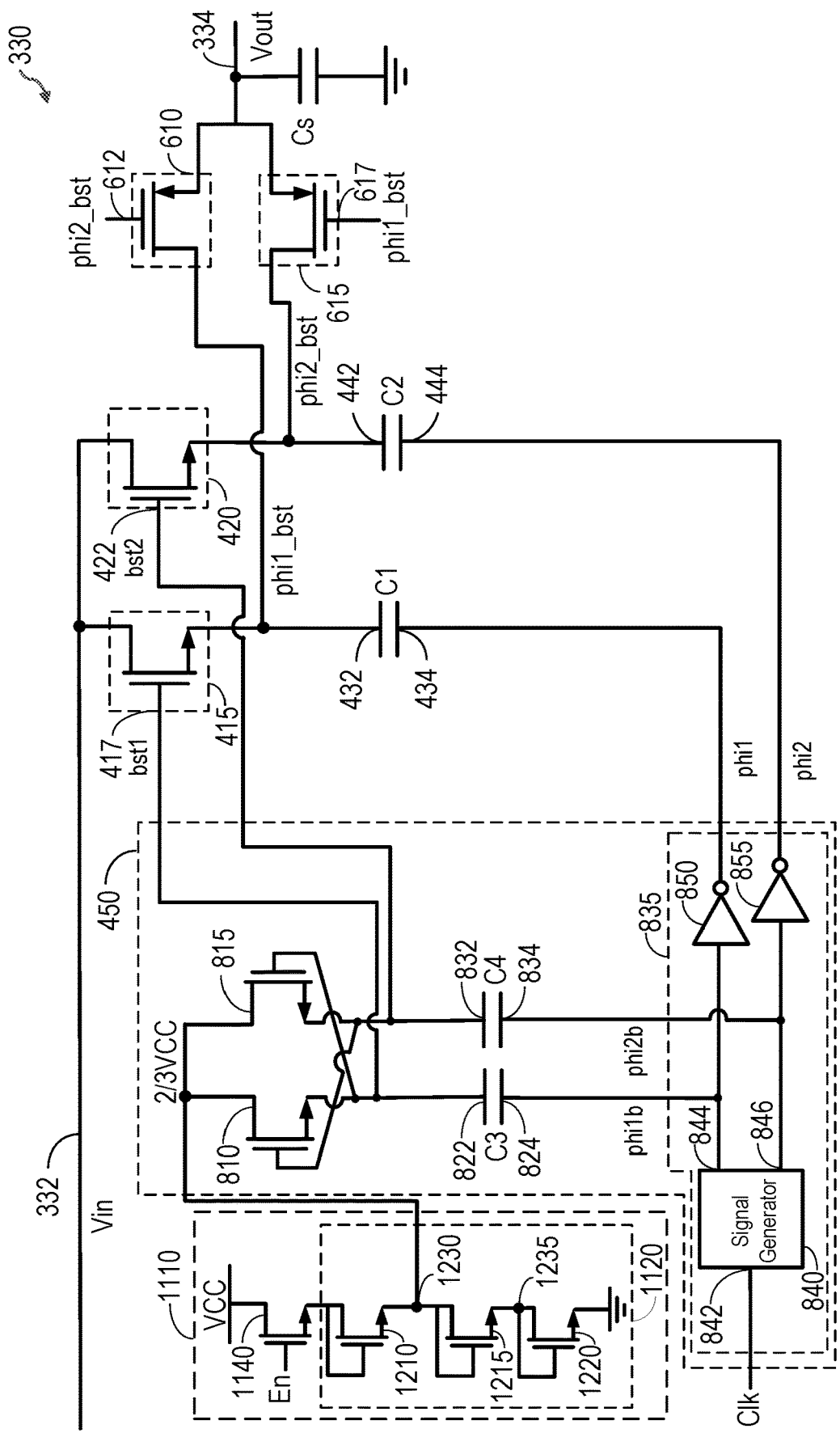
FIG. 12 shows another example of a circuit configured to prevent latch-up in a voltage booster according to certain aspects of the present disclosure.

FIG. 12 shows another exemplary implementation of the voltage divider 1120 according to certain aspects. In this example, the voltage divider 1120 includes a first diode-connected transistor 1210, a second diode-connected transistor 1215, and a third diode-connected transistor 1220 coupled in series between the enable transistor 1140 and ground. In steady state, the current flowing to the NFETs 810 and 815 is approximately zero. Since the diode-connected transistors 1210, 1215 and 1220 are coupled in series, approximately the same current flows through the diode-connected transistors 1210, 1215 and 1220 in the steady state. As the current flowing through the diode-connected transistors 1210, 1215 and 1220 is approximately the same, the diode-connected transistors 1210, 1215 and 1220 maintain the same gate-to-source voltage, which divides the voltage VCC uniformly across the diode-connected transistors 1210, 1215 and 1220. Since the voltage VCC is divided uniformly across the diode-connected transistors 1210, 1215 and 1220, the voltage between the first diode-connected transistor 1210 and the second diode-connected transistor 1215 is approximately ⅔VCC, and the voltage between the second diode-connected transistor 1215 and the third diode-connected transistor 1220 is approximately ⅓VCC. In this example, the enable transistor 1140 may be sized so that the voltage drop across the enable transistor 1140 is minimal.

In the example in FIG. 12, the voltage Vp is generated at the node 1230 between the first diode-connected transistor 1210 and the second diode-connected transistor 1215. Thus, in this example, the voltage Vp is approximately equal to ⅔VCC. Alternatively, the voltage Vp may be taken from the node 1235 between the second diode-connected transistor 1215 and the third diode-connected transistor 1220, in which case the voltage Vp is ⅓VCC.

In the example in FIG. 12, each of the diode-connected transistors 1210, 1215 and 1220 is implemented with an NFET. However, it is to be appreciated that the present disclosure is not limited to this example and that each of the diode-connected transistors 1210, 1215 and 1220 may be implemented with another type of transistor.

Figure 13:
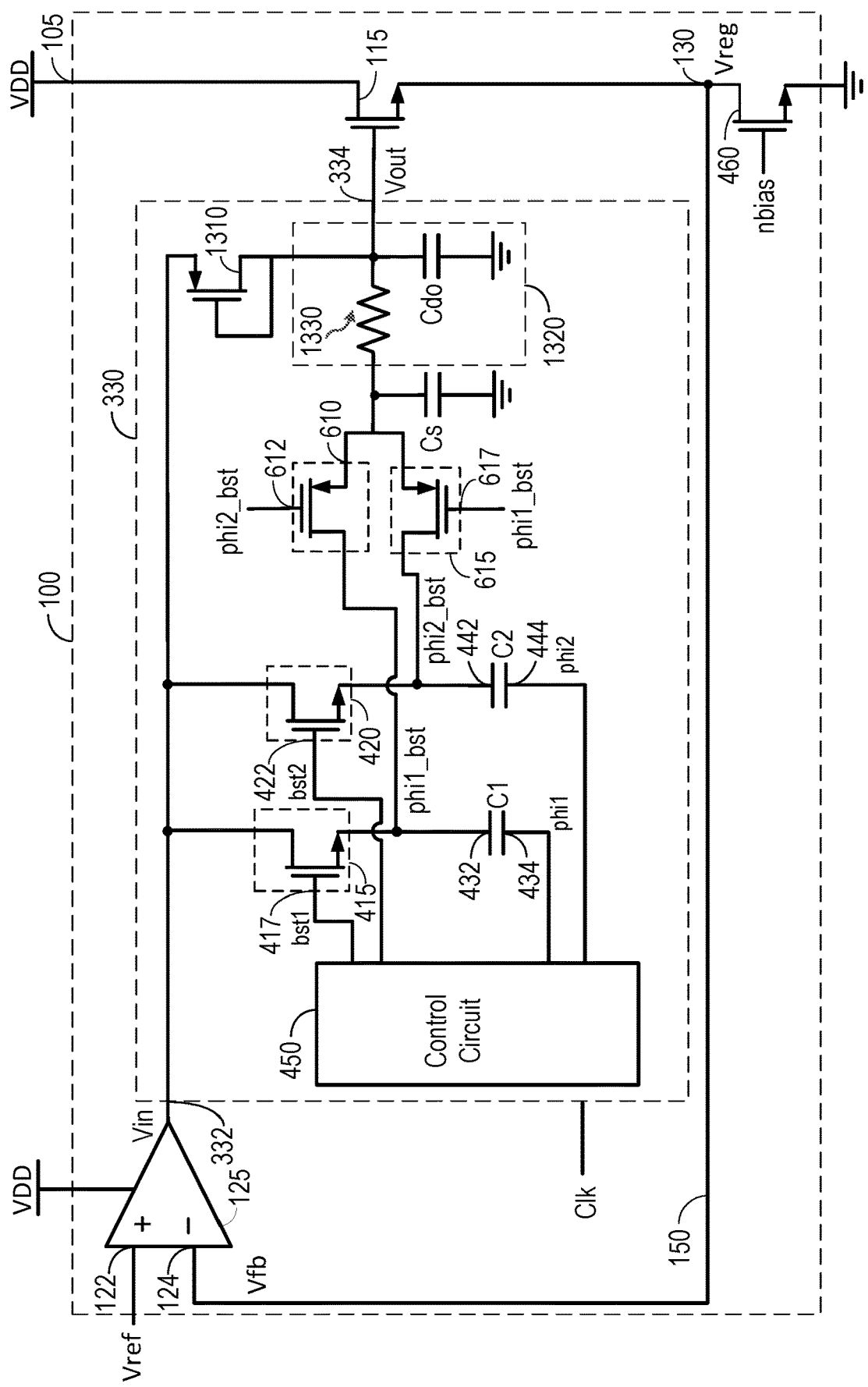
FIG. 13 shows an example of a voltage booster including a start-up diode-connected transistor and an RC circuit according to certain aspects of the present disclosure.

FIG. 13 shows an example in which the voltage booster 330 also includes a diode-connected transistor 1310 coupled between the input 332 and output 334 of the voltage booster 330. The diode-connected transistor 1310 provides faster start-up of the voltage booster 330 by charging the output capacitor Cs when the voltage booster 330 is initially turned on. More particularly, when the voltage booster 330 is initially turned on, the diode-connected transistor 1310 is forward biased and provides a charging path between the output of the error amplifier 125 and the output capacitor Cs (assuming Vin is initially greater than Vout). The charging path allows the output of the error amplifier 125 to quickly charge the output capacitor Cs through the diode-connected transistor 1310.

During normal operation, the diode-connected transistor 1310 is reversed biased. This is because, during normal operation, the boosted voltage at the output 334 of the voltage booster 330 is greater than the output voltage of the error amplifier 125. As a result, the diode-connected transistor 1310 does not conduct charge during normal operation. Thus, the diode-connected transistor 1310 is initially forward biased to provide a charging path from the output of the error amplifier 125 to the output capacitor Cs for faster start-up and reversed biased during normal operation. In the example in FIG. 13, the diode-connected transistor 1310 is implemented with a PFET having a source coupled to the output of the error amplifier 125, and a gate and a drain tied together at the output 334 of the voltage booster 330.

In the example in FIG. 13, the voltage booster 330 also includes an RC circuit 1320 coupled to the output 334 of the voltage booster 330. The RC circuit 1320 may include a resistor 1330 and a capacitor Cdo. The RC circuit 1320 may form a low-pass RC filter to filter out high frequency ripples from the output 334 of the voltage booster 330. The RC circuit 1320 may also be used to adjust the pole at the gate of the pass NFET 115 for gate compensation. For example, the pole at the gate of the pass NFET 115 may be adjusted by adjusting the capacitance of capacitor Cdo and/or the resistance of resistor 1330. In the example in FIG. 13, the output capacitor Cs is coupled to the output 334 of the voltage booster 330 via the RC circuit 1320.

Figure 14:
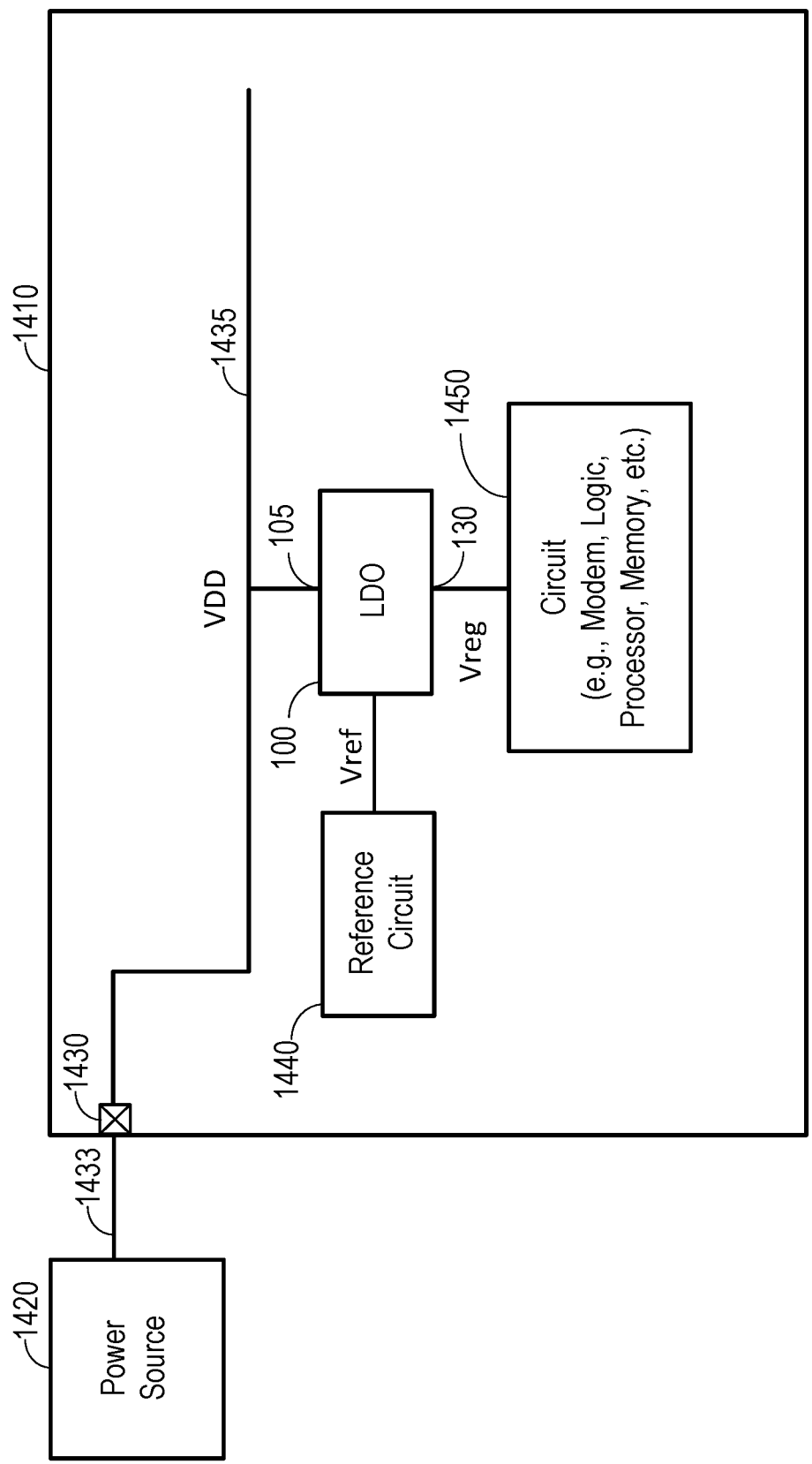
FIG. 14 shows an example of a chip including a voltage regulator according to certain aspects of the present disclosure.

FIG. 14 shows an example of a chip 1410 including the LDO regulator 100 according to certain aspects of the present disclosure. The LDO regulator 100 may be implemented using any of the exemplary implementations shown in FIGS. 4, 6, 8, 10, 11, 12 and 13. The chip 1410 includes a supply rail 1435, a supply pad 1430, a reference circuit 1440, and a circuit 1450.

In this example, the supply pad 1430 is coupled to an external power source 1420 (i.e., an off-chip power source). The power source 1420 may include a battery, a power management integrated circuit (PMIC), and/or another power source. For the example in which the power source 1420 includes a PMIC, the PMIC may include a switching regulator (not shown) configured to convert a voltage from a battery to the supply voltage VDD. The supply pad 1430 may be coupled to the power source 1420 via a metal line 1433 (e.g., on a printed circuit board).

The supply rail 1435 is coupled to the supply pad 1430. In certain aspects, the supply rail 1435 is configured to receive the supply voltage VDD from the power source 1420 via the supply pad 1430. The supply rail 1435 may include one or more metal layers on the chip 1410. The supply rail 1435 may also include one or more vias and/or one or more other metal interconnect structures for coupling the one or more metal layers.

In this example, the input 105 of the LDO regulator 100 is coupled to the supply rail 1435 and the output 130 of the LDO regulator 100 is coupled to the circuit 1450. The LDO regulator 100 receives the supply voltage VDD at the input 105 and generates the regulated voltage Vreg at the output 130 from the supply voltage VDD, as discussed above. The regulated voltage Vreg is provided to the circuit 1450 to power the circuit. The circuit 1450 may include a modem, a logic circuit (e.g., combinational logic and/or sequential logic), a processor, a memory, and/or another type of circuit.

The reference circuit 1440 is coupled to the first input 122 of the error amplifier 125 (not shown in FIG. 14) in LDO regulator 100. The reference circuit 1440 is configured to generate the reference voltage Vref and output the reference voltage Vref to the first input 122 of the error amplifier 125. As discussed above, the LDO regulator 100 regulates the voltage at the output 130 based on the reference voltage and the feedback voltage Vfb. The reference circuit 1440 may be implemented with a voltage divider, a bandgap reference circuit, etc. For the example where the reference circuit 1440 is implemented with a voltage divider (not shown), the voltage divider may include one or more variable resistors, in which the resistances of the one or more variable resistors may be programmed to program the reference voltage Vref.

Figure 15:
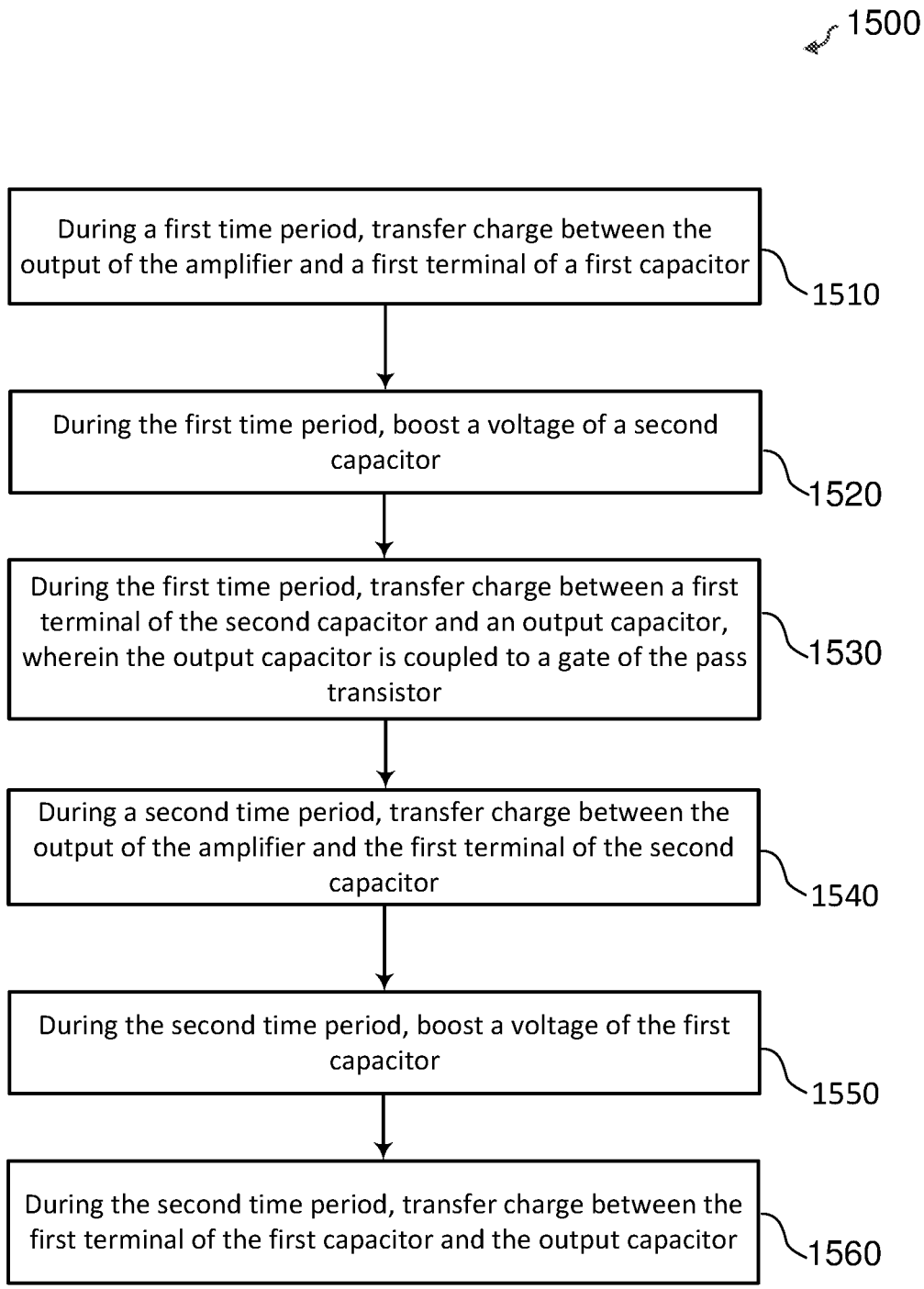
FIG. 15 is a flowchart illustrating a method of operating a voltage regulator according to certain aspects of the present disclosure.

FIG. 15 is a flowchart illustrating a method 1500 of operating a voltage regulator according to certain aspects of the present disclosure. The voltage regulator (e.g., LDO regulator 100) includes a pass transistor (e.g., pass NFET 115) coupled between an input (e.g., input 105) of the voltage regulator and an output (e.g., output 130) of the voltage regulator, and an amplifier (e.g., amplifier 125) having a first input (e.g., first input 122) coupled to a reference voltage, a second input (e.g., second input 124) coupled to the output of the voltage regulator via a feedback path (e.g., feedback path 150), and an output.

At block 1510, during a first time period, charge is transferred between the output of the amplifier and a first terminal of a first capacitor. The first capacitor may correspond to first capacitor C1, and the first time period may correspond to time period T1 in FIG. 7. In certain aspects, the first time period may be a first portion of a clock cycle. In one example, the charge transfer between the output of the amplifier and the first terminal of the first capacitor may be performed by the first switch 415 and the control circuit 450.

At block 1520, during the first time period, a voltage of a second capacitor is boosted. For example, the voltage of the second capacitor (e.g., second capacitor C2) may be boosted by the control circuit 450.

At block 1530, during the first time period, charge is transferred between a first terminal of the second capacitor and an output capacitor, wherein the output capacitor is coupled to a gate of the pass transistor. For example, charge may be transferred between the first terminal of the second capacitor and the output capacitor (e.g., output capacitor Cs) by the fourth switch 615.

At block 1540, during a second time period, charge is transferred between the output of the amplifier and the first terminal of the second capacitor. The second time period may correspond to time period T2 in FIG. 7. In certain aspects, the second time period may be a second portion of the clock cycle discussed above. The charge transfer between the output of the amplifier and the first terminal of the second capacitor may be performed by the second switch 420 and the control circuit 450.

At block 1550, during the second time period, a voltage of the first capacitor is boosted. For example, the voltage of the first capacitor may be boosted by the control circuit 450.

At block 1560, during the second time period, charge is transferred between the first terminal of the first capacitor and the output capacitor. For example, charge may be transferred between the first terminal of the first capacitor and the output capacitor by the third switch 610.

In certain aspects, transferring charge between the output of the amplifier and the first terminal of the first capacitor may include closing a first switch (e.g., first switch 415), and transferring charge between the output of the amplifier and the first terminal of the second capacitor may include closing a second switch (e.g., second switch 420). In these aspects, the method 1500 may include, during the first time period, opening the second switch, and, during the second time period, opening the first switch.

In certain aspects, boosting the voltage of the first capacitor may include applying a boosting voltage to a second terminal of the first capacitor, and boosting the voltage of the second capacitor may include applying the boosting voltage to a second terminal of the second capacitor. The boosting voltage may be Vin or another voltage.

In certain aspects, transferring charge between the first terminal of the first capacitor and the output capacitor comprises closing a first switch (e.g., third switch 610), and transferring charge between the first terminal of the second capacitor and the output capacitor may include closing a second switch (e.g., fourth switch 615). In these aspects, the method 1500 may include opening the first switch during the first time period, and opening the second switch during the second time period. In certain aspects, closing the first switch comprises routing the voltage of the second capacitor to a control input (e.g., control input 612) of the first switch (third switch 610), and closing the second switch comprises routing the voltage of the first capacitor to a control input (e.g., control input 617) of the second switch (e.g., fourth switch 615).

Implementation examples are described in the following numbered clauses:

1. A voltage regulator, comprising:
   a pass transistor coupled between an input of the voltage regulator and an output of the voltage regulator;
   an amplifier having a first input coupled to a reference voltage, a second input coupled to the output of the voltage regulator via a feedback path, and an output; and
   a voltage booster having an input coupled to the output of the amplifier and an output coupled to a gate of the pass transistor, wherein the voltage booster comprises:
   a first capacitor;
   a second capacitor;
   a first switch coupled between the input of the voltage booster and a first terminal of the first capacitor;
   a second switch coupled between the input of the voltage booster and a first terminal of the second capacitor;
   a third switch coupled between the first terminal of the first capacitor and the output of the voltage booster; and
   a fourth switch coupled between the first terminal of the second capacitor and the output of the voltage booster.

2. The voltage regulator of clause 1, wherein the third switch has a control input coupled to the first terminal of the second capacitor.

3. The voltage regulator of clause 2, wherein the fourth switch has a control input coupled to the first terminal of the first capacitor.

4. The voltage regulator of clause 3, wherein:
   the third switch comprises a first transistor, wherein the control input of the third switch is located at a gate of the first transistor; and
   the fourth switch comprises a second transistor, wherein the control input of the fourth switch is located at a gate of the second transistor.

5. The voltage regulator of clause 4, wherein the first transistor comprises a first p-type field effect transistor (PFET), and the second transistor comprises a second PFET.

6. The voltage regulator of any one of clauses 1 to 5, further comprising an output capacitor coupled between the output of the voltage regulator and a ground.

7. The voltage regulator of any one of clauses 1 to 6, further comprising:
   a voltage source, wherein the voltage source comprises a voltage divider coupled between a supply voltage rail and a ground.

8. The voltage regulator of clause 7, wherein the voltage divider comprises multiple diode-connected transistors coupled in series.

9. The voltage regulator of any one of clauses 1 to 3, further comprising
   a voltage source, wherein the voltage source comprises a voltage divider coupled between a supply voltage rail and a ground;
   a control circuit, wherein the control circuit comprises:
   a third capacitor;
   a fourth capacitor;
   a first transistor coupled between the voltage source and a first terminal of the third capacitor; and
   a second transistor coupled between the voltage source and a first terminal of the fourth capacitor, wherein a gate of the second transistor is coupled to a source of the first transistor, and a source of the second transistor is coupled to a gate of the first transistor;
   wherein the first terminal of the third capacitor is coupled to a control input of the first switch, and the first terminal of the fourth capacitor is coupled to a control input of the second switch.

10. The voltage regulator of clause 9, wherein the control circuit further comprises a voltage boosting circuit configured to alternately apply a boosting voltage to a second terminal of the third capacitor and a second terminal of the fourth capacitor.

11. The voltage regulator of any one of clauses 4 to 8, further comprising
   a voltage source, wherein the voltage source comprises a voltage divider coupled between a supply voltage rail and a ground;
   a control circuit, wherein the control circuit comprises:
   a third capacitor;
   a fourth capacitor;
   a third transistor coupled between the voltage source and a first terminal of the third capacitor; and
   a fourth transistor coupled between the voltage source and a first terminal of the fourth capacitor, wherein a gate of the fourth transistor is coupled to a source of the third transistor, and a source of the fourth transistor is coupled to a gate of the third transistor;
wherein the first terminal of the third capacitor is coupled to a control input of the first switch, and the first terminal of the fourth capacitor is coupled to a control input of the second switch.

12. The voltage regulator of clause 11, wherein the control circuit further comprises a voltage boosting circuit configured to alternately apply a boosting voltage to a second terminal of the third capacitor and a second terminal of the fourth capacitor.

13. The voltage regulator of any one of clauses 1 to 8, further comprising a control circuit coupled to the first switch and the second switch, wherein the control circuit is configured to:
turn on the first switch and turn off the second switch during a first time period; and
turn off the first switch and turn on the second switch during a second time period.

14. The voltage regulator of clause 13, wherein the control circuit is coupled to a second terminal of the first capacitor and a second terminal of the second capacitor, and the control circuit is configured to:
apply a boosting voltage to the second terminal of the second capacitor during the first time period; and
apply the boosting voltage to the second terminal of the first capacitor during the second time period.

15. The voltage regulator of clause 13 or 14, further comprising a voltage source coupled to the control circuit, the voltage source including a voltage divider coupled between a supply voltage rail and a ground.

16. The voltage regulator of clause 15, wherein the voltage divider comprises multiple diode-connected transistors coupled in series.

17. A chip, comprising:
a supply rail;
a circuit; and
a voltage regulator having an input coupled to the supply rail and an output coupled to the circuit, wherein the voltage regulator includes:
a pass transistor coupled between the input of the voltage regulator and the output of the voltage regulator;
an amplifier having a first input coupled to a reference voltage, a second input coupled to the output of the voltage regulator via a feedback path, and an output; and
a voltage booster having an input coupled to the output of the amplifier and an output coupled to a gate of the pass transistor, wherein the voltage booster comprises:
a first capacitor;
a second capacitor;
a first switch coupled between the input of the voltage booster and a terminal of the first capacitor;
a second switch coupled between the input of the voltage booster and a terminal of the second capacitor;
a third switch coupled between the terminal of the first capacitor and the output of the voltage booster; and
a fourth switch coupled between the terminal of the second capacitor and the output of the voltage booster.

18. The chip of clause 17, wherein the circuit comprises at least one of a modem, a logic circuit, a processor, or a memory.

19. The chip of clause 17 or 18, further comprising a pad coupled to the supply rail.

20. The chip of any one of clauses 17 to 19, further comprising a reference circuit coupled to the first input of the amplifier, wherein the reference circuit is configured to generate the reference voltage.

21. The chip of any one of clauses 17 to 20, wherein the third switch has a control input coupled to the first terminal of the second capacitor.

22. The chip of clause 21, wherein the fourth switch has a control input coupled to the first terminal of the first capacitor.

23. The chip of any one of clauses 17 to 22, further comprising a control circuit coupled to the first switch and the second switch, wherein the control circuit is configured to:
turn on the first switch and turn off the second switch during a first time period; and
turn off the first switch and turn on the second switch during a second time period.

24. The chip of clause 23, wherein the control circuit is coupled to a second terminal of the first capacitor and a second terminal of the second capacitor, and the control circuit is configured to:
apply a boosting voltage to the second terminal of the second capacitor during the first time period; and
apply the boosting voltage to the second terminal of the first capacitor during the second time period.

25. The chip of clause 23 or 24, further comprising a voltage source coupled to the control circuit, the voltage source including a voltage divider coupled between a supply voltage rail and a ground.

26. The chip of clause 25, wherein the voltage divider comprises multiple diode-connected transistors coupled in series.

27. A method of operating a voltage regulator, wherein the voltage regulator includes a pass transistor coupled between an input of the voltage regulator and an output of the voltage regulator, and an amplifier having a first input coupled to a reference voltage, a second input coupled to the output of the voltage regulator via a feedback path, and an output, the method comprising:
during a first time period, transferring charge between the output of the amplifier and a first terminal of a first capacitor;
during the first time period, boosting a voltage of a second capacitor;
during the first time period, transferring charge between a first terminal of the second capacitor and an output capacitor, wherein the output capacitor is coupled to a gate of the pass transistor;
during a second time period, transferring charge between the output of the amplifier and the first terminal of the second capacitor;
during the second time period, boosting a voltage of the first capacitor; and
during the second time period, transferring charge between the first terminal of the first capacitor and the output capacitor.

28. The method of clause 27, wherein:
the voltage regulator includes a first switch coupled between the output of the amplifier and the first terminal of the first capacitor, and a second switch coupled between the output of the amplifier and the first terminal of the second capacitor;
transferring charge between the output of the amplifier and the first terminal of the first capacitor comprises closing the first switch; and
transferring charge between the output of the amplifier and the first terminal of the second capacitor comprises closing the second switch.

29. The method of clause 28, further comprising:
during the first time period, opening the second switch; and
during the second time period, opening the first switch.

30. The method of any one of clauses 27 to 29, wherein:
boosting the voltage of the first capacitor comprising applying a boosting voltage to a second terminal of the first capacitor; and
boosting the voltage of the second capacitor comprising applying a boosting voltage to a second terminal of the second capacitor.

31. The method of clause 27, wherein:
the voltage regulator includes a first switch coupled between the first terminal of the first capacitor and the output capacitor, and a second switch coupled between the first terminal of the second transistor and the output capacitor;
transferring charge between the first terminal of the first capacitor and the output capacitor comprises closing the first switch; and
transferring charge between the first terminal of the second capacitor and the output capacitor comprises closing the second switch.

32. The method of clause 31, wherein:
closing the first switch comprises routing the voltage of the second capacitor to a control input of the first switch; and
closing the second switch comprises routing the voltage of the first capacitor to a control input of the second switch.

33. The method of any one of clauses 28 to 30, wherein:
the voltage regulator includes a third switch coupled between the first terminal of the first capacitor and the output capacitor, and a fourth switch coupled between the first terminal of the second transistor and the output capacitor;
transferring charge between the first terminal of the first capacitor and the output capacitor comprises closing the third switch; and
transferring charge between the first terminal of the second capacitor and the output capacitor comprises closing the fourth switch.

34. The method of clause 33, wherein:
closing the third switch comprises routing the voltage of the second capacitor to a control input of the third switch; and
closing the fourth switch comprises routing the voltage of the first capacitor to a control input of the fourth switch.

Any reference to an element herein using a designation such as "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "approximately", as used herein with respect to a stated value or a property, is intended to indicate being within 10% of the stated value or property (i.e., between 90% to 110% of the stated value or property).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

The invention claimed is:

1. A voltage regulator, comprising:
a pass transistor coupled between an input of the voltage regulator and an output of the voltage regulator;
an amplifier having a first input coupled to a reference voltage, a second input coupled to the output of the voltage regulator via a feedback path, and an output; and
a voltage booster having an input coupled to the output of the amplifier and an output coupled to a gate of the pass transistor, wherein the voltage booster comprises:
a first capacitor;
a second capacitor;
a first switch coupled between the input of the voltage booster and a first terminal of the first capacitor;
a second switch coupled between the input of the voltage booster and a first terminal of the second capacitor;
a third switch coupled between the first terminal of the first capacitor and the output of the voltage booster, wherein the third switch has a control input coupled to the first terminal of the second capacitor; and
a fourth switch coupled between the first terminal of the second capacitor and the output of the voltage booster.

2. The voltage regulator of claim 1, wherein the fourth switch has a control input coupled to the first terminal of the first capacitor.

3. The voltage regulator of claim 2, wherein:
the third switch comprises a first transistor, wherein the control input of the third switch is located at a gate of the first transistor; and
the fourth switch comprises a second transistor, wherein the control input of the fourth switch is located at a gate of the second transistor.

4. The voltage regulator of claim 3, wherein the first transistor comprises a first p-type field effect transistor (PFET), and the second transistor comprises a second PFET.

5. The voltage regulator of claim 1, further comprising an output capacitor coupled between the output of the voltage regulator and a ground.

6. A voltage regulator, comprising:
a pass transistor coupled between an input of the voltage regulator and an output of the voltage regulator;
an amplifier having a first input coupled to a reference voltage, a second input coupled to the output of the voltage regulator via a feedback path, and an output;

a voltage source, wherein the voltage source comprises a voltage divider coupled between a supply voltage rail and a ground; and a voltage booster having an input coupled to the output of the amplifier and an output coupled to a gate of the pass transistor, wherein the voltage booster comprises:
  a first capacitor;
  a second capacitor;
  a first switch coupled between the input of the voltage booster and a first terminal of the first capacitor;
  a second switch coupled between the input of the voltage booster and a first terminal of the second capacitor;
  a third switch coupled between the first terminal of the first capacitor and the output of the voltage booster;
  a fourth switch coupled between the first terminal of the second capacitor and the output of the voltage booster.

7. The voltage regulator of claim 6, further comprising a control circuit, wherein the control circuit comprises:
  a third capacitor;
  a fourth capacitor;
  a first transistor coupled between the voltage source and a first terminal of the third capacitor; and
  a second transistor coupled between the voltage source and a first terminal of the fourth capacitor, wherein a gate of the second transistor is coupled to a source of the first transistor, and a source of the second transistor is coupled to a gate of the first transistor;
  wherein the first terminal of the third capacitor is coupled to a control input of the first switch, and the first terminal of the fourth capacitor is coupled to a control input of the second switch.

8. The voltage regulator of claim 7, wherein the control circuit further comprises a voltage boosting circuit configured to alternately apply a boosting voltage to a second terminal of the third capacitor and a second terminal of the fourth capacitor.

9. The voltage regulator of claim 6, wherein the voltage divider comprises multiple diode-connected transistors coupled in series.

10. A voltage regulator, comprising:
  a pass transistor coupled between an input of the voltage regulator and an output of the voltage regulator;
  an amplifier having a first input coupled to a reference voltage, a second input coupled to the output of the voltage regulator via a feedback path, and an output; and
  a voltage booster having an input coupled to the output of the amplifier and an output coupled to a gate of the pass transistor, wherein the voltage booster comprises:
    a first capacitor,
    a second capacitor,
    a first switch coupled between the input of the voltage booster and a first terminal of the first capacitor,
    a second switch coupled between the input of the voltage booster and a first terminal of the second capacitor,
    a third switch coupled between the first terminal of the first capacitor and the output of the voltage booster, and
    a fourth switch coupled between the first terminal of the second capacitor and the output of the voltage booster; and
  a control circuit coupled to the first switch and the second switch, wherein the control circuit is configured to:
    turn on the first switch and turn off the second switch during a first time period; and
    turn off the first switch and turn on the second switch during a second time period.

11. The voltage regulator of claim 10, wherein the control circuit is coupled to a second terminal of the first capacitor and a second terminal of the second capacitor, and the control circuit is configured to:
  apply a boosting voltage to the second terminal of the second capacitor during the first time period; and
  apply the boosting voltage to the second terminal of the first capacitor during the second time period.

12. The voltage regulator of claim 11, wherein the third switch has a control input coupled to the first terminal of the second capacitor.

13. The voltage regulator of claim 12, wherein the fourth switch has a control input coupled to the first terminal of the first capacitor.

14. The voltage regulator of claim 10, further comprising a voltage source coupled to the control circuit, the voltage source including a voltage divider coupled between a supply voltage rail and a ground.

15. The voltage regulator of claim 14, wherein the voltage divider comprises multiple diode-connected transistors coupled in series.

16. A chip, comprising:
  a supply rail;
  a circuit; and
  a voltage regulator having an input coupled to the supply rail and an output coupled to the circuit, wherein the voltage regulator includes:
    a pass transistor coupled between the input of the voltage regulator and the output of the voltage regulator;
    an amplifier having a first input coupled to a reference voltage, a second input coupled to the output of the voltage regulator via a feedback path, and an output; and
    a voltage booster having an input coupled to the output of the amplifier and an output coupled to a gate of the pass transistor, wherein the voltage booster comprises:
      a first capacitor;
      a second capacitor;
      a first switch coupled between the input of the voltage booster and a terminal of the first capacitor;
      a second switch coupled between the input of the voltage booster and a terminal of the second capacitor;
      a third switch coupled between the terminal of the first capacitor and the output of the voltage booster, wherein the third switch has a control input coupled to the first terminal of the second capacitor; and
      a fourth switch coupled between the terminal of the second capacitor and the output of the voltage booster.

17. The chip of claim 16, wherein the circuit comprises at least one of a modem, a logic circuit, a processor, or a memory.

18. The chip of claim 16, further comprising a pad coupled to the supply rail.

19. The chip of claim 16, further comprising a reference circuit coupled to the first input of the amplifier, wherein the reference circuit is configured to generate the reference voltage.

20. A method of operating a voltage regulator, wherein the voltage regulator includes a pass transistor coupled between an input of the voltage regulator and an output of the voltage regulator, and an amplifier having a first input coupled to a reference voltage, a second input coupled to the output of the voltage regulator via a feedback path, and an output, the method comprising:
- during a first time period, transferring charge between the output of the amplifier and a first terminal of a first capacitor;
- during the first time period, boosting a voltage of a second capacitor;
- during the first time period, transferring charge between a first terminal of the second capacitor and an output capacitor, wherein the output capacitor is coupled to a gate of the pass transistor;
- during a second time period, transferring charge between the output of the amplifier and the first terminal of the second capacitor;
- during the second time period, boosting a voltage of the first capacitor; and
- during the second time period, transferring charge between the first terminal of the first capacitor and the output capacitor.

21. The method of claim 20, wherein:
the voltage regulator includes a first switch coupled between the output of the amplifier and the first terminal of the first capacitor, and a second switch coupled between the output of the amplifier and the first terminal of the second capacitor;
transferring charge between the output of the amplifier and the first terminal of the first capacitor comprises closing the first switch; and
transferring charge between the output of the amplifier and the first terminal of the second capacitor comprises closing the second switch.

22. The method of claim 21, further comprising:
during the first time period, opening the second switch; and
during the second time period, opening the first switch.

23. The method of claim 20, wherein:
boosting the voltage of the first capacitor comprising applying a boosting voltage to a second terminal of the first capacitor; and
boosting the voltage of the second capacitor comprising applying a boosting voltage to a second terminal of the second capacitor.

24. The method of claim 20, wherein:
the voltage regulator includes a first switch coupled between the first terminal of the first capacitor and the output capacitor, and a second switch coupled between the first terminal of the second transistor and the output capacitor;
transferring charge between the first terminal of the first capacitor and the output capacitor comprises closing the first switch; and
transferring charge between the first terminal of the second capacitor and the output capacitor comprises closing the second switch.

25. The method of claim 24, wherein:
closing the first switch comprises routing the voltage of the second capacitor to a control input of the first switch; and
closing the second switch comprises routing the voltage of the first capacitor to a control input of the second switch.

* * * * *